(12) United States Patent
Newman

(10) Patent No.: US 10,591,621 B1
(45) Date of Patent: *Mar. 17, 2020

(54) DIRECTIONAL NEUTRON DETECTOR

(71) Applicant: David Edward Newman, Poway, CA (US)

(72) Inventor: David Edward Newman, Poway, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/524,104

(22) Filed: Jul. 28, 2019

Related U.S. Application Data

(63) Continuation of application No. 15/477,083, filed on Apr. 1, 2017, now Pat. No. 10,371,837.

(60) Provisional application No. 62/436,013, filed on Dec. 19, 2016, provisional application No. 62/443,700, filed on Jan. 7, 2017, provisional application No. 62/464,778, filed on Feb. 28, 2017.

(51) Int. Cl.
*G01T 3/08* (2006.01)
*G01T 3/06* (2006.01)

(52) U.S. Cl.
CPC ...................................... *G01T 3/06* (2013.01)

(58) Field of Classification Search
None
See application file for complete search history.

(56) References Cited

U.S. PATENT DOCUMENTS

| | | | |
|---|---|---|---|
| 5,036,202 A | 7/1991 | Schulte | |
| 5,345,084 A | 9/1994 | Byrd | |
| 5,659,177 A | 8/1997 | Schulte | |
| 5,880,469 A | 3/1999 | Miller | |
| 6,392,236 B1 | 5/2002 | Maekawa | |
| 6,639,210 B2 | 10/2003 | Odom | |
| 7,521,686 B2 | 4/2009 | Stuenkel | |
| 7,667,206 B1 | 2/2010 | Hindi | |
| 7,863,579 B2 | 1/2011 | Suhami | |
| 8,642,972 B2 | 2/2014 | Fukuda | |
| 9,477,005 B2 | 10/2016 | Chandrasekharan | |
| 10,371,837 B2 * | 8/2019 | Newman | G01T 3/06 |
| 2004/0227098 A1 | 11/2004 | Tarabrine | |
| 2009/0045348 A1 | 2/2009 | Stuenkel | |
| 2009/0166549 A1 | 7/2009 | Czirr | |
| 2015/0301203 A1 | 10/2015 | Lennert | |
| 2017/0219724 A1 | 8/2017 | Marsden | |

* cited by examiner

*Primary Examiner* — David P Porta
*Assistant Examiner* — Mamadou Faye

(57) ABSTRACT

A neutron detector that indicates the direction toward a neutron source. The detector is a proton-recoil type of detector, in which two different scintillators are positioned on both sides of a hydrogenous target. Proton recoil signals from the two scintillators indicate whether neutrons arrive from the left, right, or center relative to the detector alignment. Surprisingly high precision can be obtained by orienting the detector so that the counting rates in the two scintillators are equal, at which point the target layer is directly aligned with the source. Disclosed are thick and thin target configurations, versions for discriminating pulses from the two scintillators, options for assembling a multi-detector stack and array, and multiple analysis procedures for optimally locating the neutron source.

20 Claims, 17 Drawing Sheets

DIRECTIONAL NEUTRON DETECTOR

CROSS REFERENCE TO RELATED APPLICATIONS

This application is a continuation of U.S. patent application Ser. No. 15/477,083 entitled "Directional Neutron Detector" and filed on Apr. 1, 2017, which claims the benefit of U.S. Provisional Patent Application No. 62/436,013 entitled "Gamma-Blind Neutron Detector" and filed on Dec. 19, 2016, and U.S. Provisional Patent Application No. 62/443,700 entitled "Dual-Scintillator Radiation Detector" and filed on Jan. 7, 2017, and U.S. Provisional Patent Application No. 62/464,778 entitled "Directional Neutron Detector" and filed on Feb. 28, 2017; the entire disclosures of which are incorporated by reference as part of the specification of this application.

FIELD OF INVENTION

The invention relates to neutron detectors, and particularly to neutron detectors that indicate the direction of the neutron.

BACKGROUND OF THE INVENTION

Detection of nuclear bomb material is an urgent national priority. Nuclear weapons and their components can be transported easily in shipping containers, trucks, and rail cars. Rogue states and non-state adversaries could use clandestine delivery for terrorism or extortion, with little risk of detection. The US government has ordered that all cargo be scanned for nuclear materials at border crossings and shipping ports, but there is yet no suitable means for doing so.

Neutron radiation is a signature of plutonium, the key component of most nuclear weapons. However, neutron radiation can be shielded, greatly reducing the number of detectable particles. To detect a shielded weapon or a small portion of smuggled plutonium, the maximum information must be obtained from any detectable neutrons. In addition, the neutron detector must reject background radiation such as cosmic rays and gamma rays from various radioactive materials in the environment. Roughly 1% of the maritime containers entering US ports have detectable gamma radiation, primarily due to items containing bentonite clay, potassium, granite, and some lighting and electronic devices. Neutron emitters are far less common than gamma emitters in cargo. Only about 0.01% of the border shipments produce a detectable neutron emission, due primarily to radioactive sources for industrial inspections, well logging, and research.

Neutrons from plutonium typically have an energy of about 1 MeV, with a spread in energies from about 0.5 to about 5 MeV generally. Neutrons in that energy range interact with matter primarily by scattering from an atomic nucleus. For most nuclei, the scattering can be either elastic or inelastic depending on the nucleus and other factors. For hydrogen, however, only elastic scattering is possible since $^1$H has no excited nuclear states. In n-p scattering, a variable amount of energy, about half of the neutron energy on average, is transferred to the recoil proton. The proton emerges with an energy and direction that depend on the scattering angle. The recoil protons with the highest energy emerge in a direction closest to the initial neutron direction, as required by momentum conservation.

Gamma rays typically interact with matter by photoelectric absorption, Compton scattering, or pair production, each of which generates one or more energetic electrons (positrons being treated as electrons herein). Electrons with 1-2 MeV typically have a relatively low rate of energy deposition in matter, in contrast to the recoil protons which have a very high energy deposition rate. Accordingly, gamma-generated electrons have a much longer stopping range (stopping distance) than the neutron-recoil protons. Depending on the energy and the material, gamma-generated electrons typically travel many millimeters or even centimeters before stopping, whereas recoil protons typically stop in a few microns to a few tens of microns.

A directional neutron detector would be a valuable inspection tool by helping inspectors to localize a source of neutron radiation. Determining the neutron direction would greatly amplify the statistical power of each detection. For example, during a 60-second vehicle scan, two or three detected neutrons would probably not be sufficient to trigger an alarm, since background neutrons are always present from cosmic rays and environmental sources. But detecting two or three neutrons coming from the same place in the vehicle would certainly be suspicious, thereby prompting a secondary examination. For revealing neutron threats, the overall effectiveness of a directional neutron detector is about two orders of magnitude greater than a simple non-directional detector due to the localization of the source.

What is needed, then, is a neutron detector that indicates the neutron direction, focusing on the few-MeV energy range, suitable for scanning whole containers and vehicles at shipping ports and border crossings. Preferably such a detector would also enable improved scanning of personnel in a walk-through portal application, and would also lead to an improved direction-dependent neutron survey meter. The detector should have high detection efficiency for neutrons, yet have excellent rejection of gamma rays and other non-neutron backgrounds. Preferably the detector uses no scarce materials, and has low cost.

SUMMARY OF THE INVENTION

The invention is a proton-recoil neutron detector that indicates the direction of the neutron. The detector comprises a hydrogenous target material configured as a substantially planar layer, with two substantially planar scintillator layers positioned proximate to opposite sides of the target. An incident neutron scatters in the target by n-p elastic scattering, thereby expelling a recoil proton which passes into one of the scintillators, The two scintillator layers are substantially parallel to each other, and are configured to produce light pulses when traversed by a charged particle such as the recoil proton. The scintillator struck by the recoil proton then responsively emits a light pulse, which is detected by a light sensor. The two scintillators thereby indicate the direction from which the neutron arrives (or equivalently, the direction to the neutron source) since they reveal the direction of the recoil proton, which is related to the neutron direction by momentum conservation.

For example, if the neutron arrives from the right side of the detector and scatters in the target, the recoil proton is most likely to emerge toward the left since it acquires a portion of the neutron momentum. Hence the scintillator proximate to the left side of the target would register the hit. If the neutron arrives from the left, the recoil proton is highly likely to hit the scintillator on the right. Furthermore, the detector can precisely indicate the source direction, by being rotated until both scintillators exhibit about the same counting rate. The two scintillator signals indicate when the target layer is directly aligned with the neutron source, because the recoil proton is then equally likely to scatter into the first and second scintillators. Thus the inventive detector indicates the left-right direction toward the neutron source (relative to the detector orientation), and also indicates when the detector is pointing directly toward the source, according to the two scintillator detection rates. Such a detector would be extremely useful for localizing a neutron source such as a clandestine nuclear weapon, smuggled nuclear components, or inadvertent contamination.

The first and second scintillators are proximate to opposite sides of the target layer. Herein, a "planar" layer is a flat layer in which the thickness is much smaller than the other two dimensions. The term "opposite" has its geometrical meaning, wherein the two sides or faces of a planar layer are substantially orthogonal to the thickness direction and are on opposite sides of the layer.

Neutron scattering involves a random scattering angle that determines how much energy the recoil proton receives, and also affects the recoil proton direction. The directional correlation between the neutron and the recoil proton is strongest for the highest energy protons since they receive most of the initial neutron momentum, whereas the lowest energy protons have the largest angular uncertainty. Beneficially, the highest energy protons are also the ones most likely to escape from the target and be counted, while the lowest energy protons are preferentially absorbed in the target. Simulations show that, as a result of this angular correlation effect, a small number of neutron detections are sufficient to localize a neutron source to within a few degrees.

Numerous configurations of the inventive detector are disclosed herein. Versions are disclosed with thick or thin targets, single or double targets, optional light guides and reflectors and barriers in various relationships. Further versions employ different methods to determine which scintillator is active, involving different scintillator properties and multiple sensors. Configurations of stacked detectors are disclosed comprising multiple targets and multiple scintillators in stacked layers, to obtain increased detection speed and efficiency. The invention includes various methods for analyzing the scintillator data versus angle to obtain high precision, and various fabrication methods as detailed below. The common and essential feature among all the versions of the invention is that there are two scintillators on opposite sides of the hydrogenous target, so that the recoil proton indicates the neutron direction according to which scintillator is activated.

The hydrogenous target comprises any solid material that includes hydrogen, preferably with a high density of hydrogen. Example target materials include polyethylene or other polymer, a hydrated crystal or mineral, or other hydrogen-bearing compound. The target may comprise a precast sheet or may be deposited as a vapor or may be applied as a liquid film which is then polymerized or dried for example. Preferably the target is substantially planar, since a flat geometry provides the best angular resolution. The target may have any thickness. For example the target may be very thin and have a thickness related to the recoil proton stopping range, which is typically a few microns to a few tens of microns. Or, the target may be thick enough to transport scintillation light, which usually is in the range of 0.1 to 10 mm. Usually the target is non-scintillating, to avoid producing background light. But in some embodiments the target is itself a scintillator which produces a light pulse different from that of the other scintillators.

Each scintillator produces a light pulse when traversed by the recoil proton. The scintillators are preferably parallel to each other and to the target so that the finest angular resolution is obtained. Any deviation from parallelism or planarity of the scintillator layers would tend to broaden the angular resolution of the detector accordingly. The scintillators are preferably very thin, with a thickness related to the recoil proton stopping range. The thinness enables rejection of gamma rays and other minimum-ionizing backgrounds that produce very little light in passing through the thin scintillators, whereas recoil protons have a very high rate of ionization and thus generate a large light signal. On the other hand, the scintillator should not be so thin that the recoil proton produces insufficient light for reliable detection. Often the scintillator thickness is equal to the maximum expected proton stopping range, thereby obtaining the maximum light from the proton track.

To indicate the neutron direction, the inventive detector must determine which scintillator was struck. In a first version, termed the "pulse-shape-discrimination" version, the two scintillators comprise different materials that produce detectably different light pulses with different duration or shape. In a second "wavelength-discrimination" version, the two scintillators emit light of detectably different wavelengths, which are then separated by two optical filters and detected by two light sensors. In a third "light-path-discrimination" version, the two scintillators have the same composition and identical light properties, but the light pulses from the two scintillators are kept separate using reflectors and opaque barriers. In each case, the output signals indicate which scintillator was hit, and thereby indicate the direction of the incident neutron.

The scintillators are preferably hydrogen-free to avoid producing recoil protons that would interfere with the directional measurement. The scintillators are preferably planar layers so as to obtain precise angular measurements. Suitable materials are any inorganic scintillator such as $CaF_2$ or BGO or cerium-activated glass. Preferably the glass is free of lithium and boron, to avoid neutron interactions that would interfere with the proton recoil measurement. Hygroscopic scintillators such as CsI or NaI are possible if well-sealed from environmental moisture. ZnS is possible although it is not transparent to its own light, causing problems with light transmission.

Although not preferred, it is possible that the scintillators could contain hydrogen, such as plastic scintillator sheets which have the advantage of low cost and easy assembly. The disadvantage is that n-p scattering events in the scintillators would partially, but not entirely, obscure the directional measurement. The interference could be minimized by making the scintillators much thinner than the proton stopping range, or fabricating them with deuterium substituting for hydrogen, or selecting a polymer with minimal hydrogen content.

The scintillator light is conveyed to the light sensor. In the thick-target version, the target itself serves as the light guide, and is optically coupled to one or both of the scintillators, and is optically coupled to at least one sensor. In the thin-target version, the light is carried by one or two additional light guides, each comprising a non-hydrogenous transparent body that is optically coupled to one or two scintillators and to at least one sensor.

The light sensor or sensors are any transducers that produce an electronic output signal related to the light received by the sensor, such as photomultiplier tubes, silicon avalanche photodiodes, and the like.

The detector can include a thin reflective layer between each scintillator and its proximate target. The reflective layer may assist in light transmission, or isolate the two scintillators optically, or may protect the material surfaces for example. However, such a reflective layer must be extremely thin to avoid blocking the recoil protons. Preferably the reflective layer is just thick enough to provide the reflectivity or opacity needed, and no thicker. For example an aluminum deposit with a thickness of 20 to 200 nm may be suitable.

The detector can include an opaque barrier between two light guides to isolate them optically. This is important for light-path-discrimination wherein the two scintillators comprise the same material with the same light pulse properties. The opaque barrier ensures that the light from the first scintillator reaches a first sensor, and the light from the second scintillator reaches a second sensor with no cross-talk, that is, the two light paths are isolated from each other. The barrier may also be reflective to enhance light transmission. Aluminum foil or black paper are possible choices.

Often the invention comprises a stack of detectors comprising multiple targets and multiple scintillators of the first and second types, all arranged in a particular sequence or order, so as to indicate the direction from which a neutron has arrived, according to whether a first or second type scintillator is active. Such a stack provides increased detection efficiency due to the large number of targets. Preferably the two scintillator types alternate in position throughout the stack, with a first scintillator to the left of a target and then a second scintillator to the right of the target, and so on. Or the two scintillators could be on alternate sides of successive targets, with the same effect. Such alternation enables rejection of many penetrating backgrounds, for example penetrating electrons or muons that trigger both the first and second scintillator types, and thereby can be rejected.

The invention includes an array of detectors, each detector being oriented at a different angle. Each such detector can comprise a single-target device or a double-target configuration or a detector stack having many parallel targets and scintillators. The detectors (or detector stacks) are oriented at different angles, such as an angularly spaced-apart array of detector orientations. The signals from the first and second scintillators in each of the detectors can then be analyzed versus the detector angle, to determine where the neutrons are coming from. If one of the detectors in the array happens to be aimed directly or almost directly at the source, then the two types of scintillators in that detector will register nearly equal counting rates, thereby providing enhanced angular precision in the source location. An advantage of such an array is that the neutron source can be localized without rotating the detector.

The invention includes methods to process the scintillator signals to determine the neutron angle, and particularly to localize the source precisely. The detector can be rotated until the two scintillators exhibit the same counting rate, at which point the source is then directly aligned with the target plane. Or the detector can be rotated to find the two angles at which the two scintillators produce about half their maximum counting rates, in which case the source angle is the average between those two half-maximum-rate angles. Or, a function such as the product of the two counting rates can be formed, in which a clear localized peak indicates the source direction. Or, the difference between the two counting rates can be checked, in which a zero-cross condition indicates the source azimuth.

Further inventive methods are disclosed below for assembling the detector in both thin-target and thick-target configurations. Methods are also provided for construction of the detector stack configuration in various versions, including low-cost mass-produced subassemblies that are easily put together in detector arrays of unlimited size.

The inventive detector offers many advantages. First, it provides a reliable left-right indication of the source direction quickly, as soon as two or three neutron scattering events have been detected. Second, with further data as a function of the detector angle, the direction of the neutron source is determined with surprising precision. Third, the detector is highly insensitive to background gamma rays since the scintillators, being only microns-thick, produce almost no light when traversed by a Compton electron or other gamma-generated electron. Other backgrounds can be rejected since they most probably will trigger both scintillators.

Further advantages pertain to manufacturability and economics. The inventive detector is simple to manufacture, requiring only layered depositions onto a light guide substrate, followed by attachment of the light sensor. The inventive detector is readily expanded to arrays, including very large arrays, suitable for rapid vehicle inspections and cargo scanning. The high cost of prior-art detectors is due to their reliance on costly scintillators, expensive light sensors, sealed tubes, fine wires, gas-treatment facilities, and vanishing materials such as $^3$He. The inventive detector has none of these defects. The inventive detector uses scintillator materials very sparingly and only in micron-thin layers, it is compatible with a very wide variety of light sensors including the slower and lower-cost solid state sensors, and it has absolutely nothing to do with $^3$He.

Many critical applications, previously deemed economically infeasible, may now be addressed with the new low-cost directional neutron detection system.

DETAILED DESCRIPTION

Figure 1:
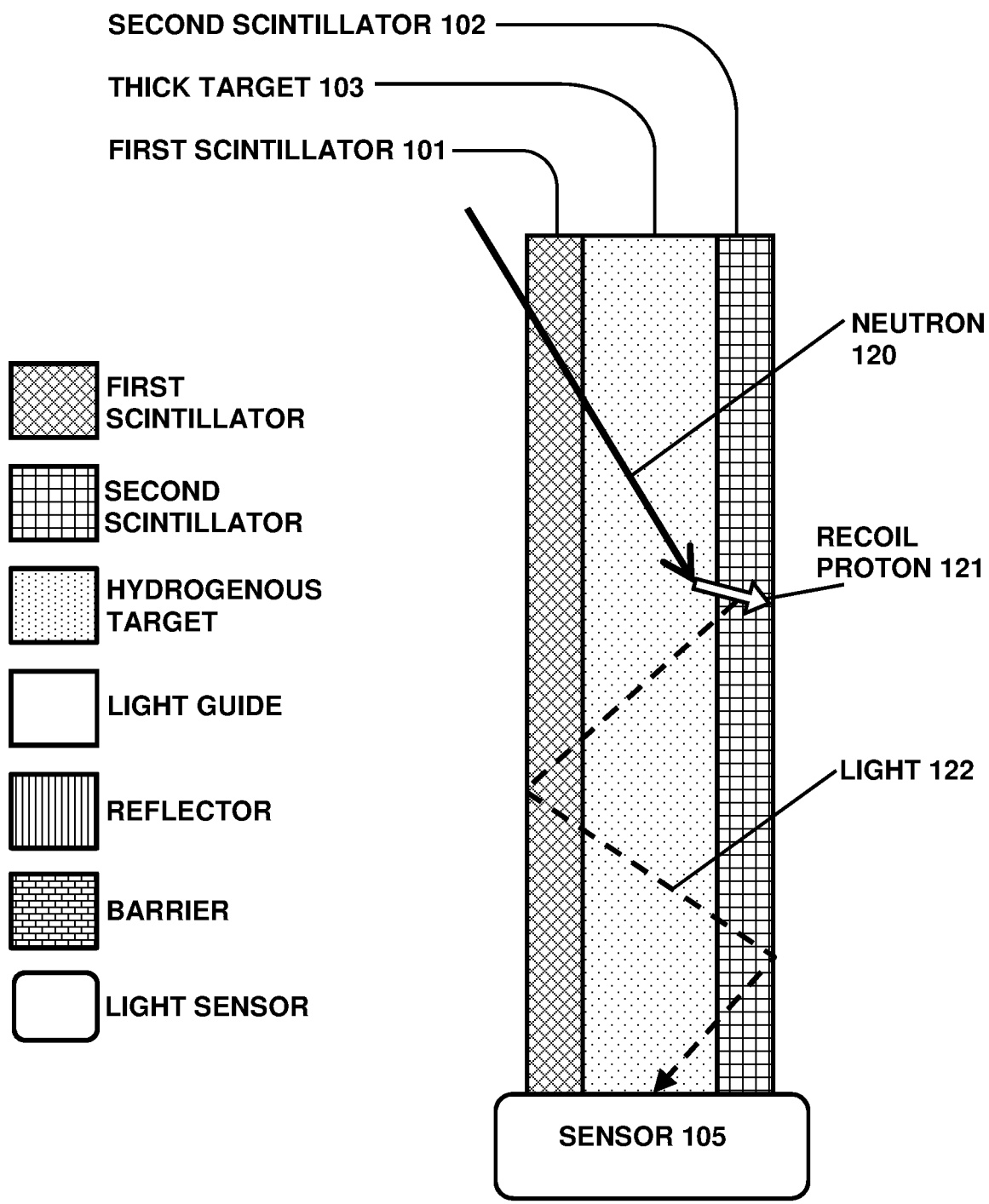
FIG. 1 is a cross-section sketch of a neutron detector according to the invention, in the thick-target configuration, with the pulse-shape-discrimination version. A typical neutron scattering event is shown. The various layers are shown schematically. (Thin layers are not to scale. The thin layers are shown greatly expanded.)

The inventive target is usually a polymer such as $CH_2$, or it could alternatively be a hydrated mineral or ceramic layer (for high temperature applications), or other compounds that include hydrogen. The target could be any thickness, with different advantages for each. A thin target, with a thickness related to the recoil proton stopping range, is efficient in that many of the recoil protons are able to escape from the thin target layer and be detected. Such a thin target is easily applied in sheet or film form, or deposited as a liquid layer that is then polymerized or dried to achieve the desired thickness. Usually in the thin-target configuration a pair of transparent non-scintillating non-hydrogenous light guides are optically coupled to the two scintillators respectively, to enable efficient transport of the light to the sensor.

In the thick-target version, the target is a transparent hydrogenous plate, usually a polymer, which is thick enough to serve as a light guide, and may also provide structural strength to the assembled system. Usually there is no need for additional light guides since the thick target light guide carries the scintillator light to the sensor. The thick target is less efficient than the thin target, because the stopping range of a recoil proton is only a small fraction of the total target thickness, so only those neutron scattering events that occur very close to the surface of the target are detectable. However, the thick-target configuration has the advantages of simplicity and economy and ruggedness.

As a further alternative, a thin target could be split into two separate layers. In this case the detector is centered on a single transparent non-hydrogenous non-scintillating light guide. The two scintillators are applied to the two sides of the light guide, and two hydrogenous targets are affixed on the outside surfaces of the two scintillators. Although the two scintillators are proximate to two different targets in this case, it remains true that one scintillator is to the left of its target while the other scintillator is to the right of its target, so that the relative counting rates of the two scintillators again indicate the direction of the neutron. The advantage of the double-target configuration is its extreme structural simplicity and ruggedness, since the device consists typically of a simple glass plate with scintillator material deposited on both sides, then coated in a thin plastic target layer.

The inventive scintillators are preferably non-hydrogenous, which largely rules out organic compounds. Organic scintillators contain hydrogen which would lead to interference from proton recoil events in the scintillators. Many suitable inorganic, non-hydrogenous scintillators are available, depending on the type of discrimination for determining which of the scintillators has detected the recoil proton. For the pulse-shape-discrimination version of the invention, the scintillators must produce light pulses with different pulse durations. Suitable scintillators could be $CaF_2(Eu)$ or BGO which have pulse durations of 900 and 300 ns respectively, and which are sufficiently distinct that standard electronics can easily separate the two pulse types. Alternatively, the two scintillators could be NaI(Tl) and CsI(Na) with pulse durations of 230 and 460 ns respectively, although these two are not as far apart. In addition the latter pair is hygroscopic, and thus would require a hermetic enclosure. Non-activated CsI is an option. Various glass formulations may be considered. Although glass tends to be less bright than the other inorganics, thin layers of glass scintillator are relatively cheap and can be assembled in layered stacks easily. Also, the light pulse properties are somewhat adjustable by varying the composition of the glass. The glass may be activated with Ce or Tb, but preferably not with B or Li, to avoid interference from neutron capture reactions.

For the wavelength-discrimination version of the invention, the two scintillators must produce light pulses with different wavelength ranges. Suitable scintillators could be $CaF_2(Eu)$ and unactivated $BaF_2$ which have a primary wavelengths output of 435 and 220-310 nm respectively. These are well separated in wavelength, although the latter short wavelength may require use of UVT materials for the waveguide and sensor, or a wavelength shifter. To separately detect the light from the two scintillators, a pair of light sensors with optical filters is used. Typically the two filters would be a high-pass and a low-pass filter without significant overlap. In this case, the two filters would have a 50% cutoff at about 370-380 nm. Alternatively, if hygroscopic materials can be accommodated, NaI(Tl) and CsI(Tl) emit at 415 and 540 nm which could be easily separated with dichroic filters. An advantage of dichroic filters is that they can be made to reflect, rather than absorb, the out-of-band photons, thereby allowing the other detector to receive them. There are many other scintillator possibilities for both pulse shape and wavelength discrimination besides these examples.

For the light-path-discrimination option, any non-hydrogenous scintillators would do, so long as the two scintillators are coupled to two separate light guides and viewed by two separate light sensors. Typically, the detector includes a number of reflective layers and opaque barriers to define each light path separately, and to block light from the other path. An advantage of the light-path-discrimination version is that the two scintillators can use the same type of scintillation material, thereby simplifying the fabrication process and also ensuring similar performance for the two sides. The light-path-discrimination version requires that several extra reflective layers be applied to the various materials, in order to keep the light paths separate, but this may not be a problem since it is relatively easy to deposit a thin layer of aluminum or gold to a surface.

As a further option, plastic scintillators may be considered even though they contain hydrogen. Neutron scattering events in the scintillators would simply add background counts to the target recoil events, thereby diluting the measurement. But this may be tolerable if the scintillators are particularly thin, or have a relatively low hydrogen content compared to the target material. The advantage is that plastic scintillators are economical and easy to assemble in large arrays.

As a further alternative, the two scintillators could be inorganic scintillators, while the target could comprise a plastic scintillator. Since plastic scintillators are hydrogenous, such a target would emit a characteristic light pulse upon each n-p scattering as the recoil proton travels through the target-scintillator. The light properties of the plastic scintillator must be detectably different from the other two scintillators, so that the target light pulses can be separated from the other two scintillator signals. An acceptable event would then include a target light pulse, plus one of the other scintillator light pulses at the same time. Events with all three scintillator pulses would be rejected as backgrounds. Additionally, events with only the target scintillator pulse alone would be tallied separately as a measure of the overall neutron flux.

The thin-target configuration of the detector includes two non-hydrogenous light guides, one coupled to each of the scintillators, to convey the light pulses to the light sensor. The advantage of making the light guides hydrogen-free is that such a material does not generate recoil protons which would interfere with those from the target. Typically the light guides are made of glass, with a thickness of about 0.1 mm to 10 mm depending on how far the light is to be conveyed. The light guide may include a wavelength shifter to reduce absorption in the light guide, or for better matching to the acceptance bandwidth of the light sensor, or to randomize the photon directions in the light guide, or for other reason.

Light sensors are optically coupled to the light guides in the thin-target configuration, or to the target in the thick-target configuration. The light sensor is any device that produces electrical signals responsive to scintillation light, thereby indicating which of the scintillators was hit. The light sensors may be photomultiplier tubes, solid state sensors such as SiPM avalanche photodiodes, or other light transducers. In the pulse-shape-discrimination version, the sensor must be fast enough to resolve the pulse shape or duration. In the wavelength-discrimination and the light-path-discrimination versions, on the other hand, the light sensor can be a slow or charge-integrating detector such as a CCD, provided that the noise and backgrounds are low enough that the neutron events dominate. One or more light sensors can view a single light guide or multiple light guides together.

The invention includes a method for determining the neutron direction, based on the signals in the two scintillators (which may be termed scintillator-A and scintillator-B). In a first method, the "rotated-detector" method, the directional detector is rotated, usually about a vertical axis, while the scintillator-A and -B detection rates are recorded or otherwise monitored. When the A and B counting rates are equal, the detector is oriented directly toward the source.

A simpler version of this method is to subtract one counting rate from the other. This differential function has a clear zero-cross at an angle corresponding directly to the source. An advantage of the differential method is that it is not necessary to find the exact orientation with equal counting rates, since a curve fit to the other angle measurements can define the zero-cross point precisely.

When the target is exactly aligned with the source, it is impossible to tell if the source is in front or behind the detector, since both scintillators are symmetrically positioned relative to the target. However this is easily resolved by turning the detector a few degrees and noting which scintillator then has a higher counting rate. For example, a detector may be constructed with scintillator-A to the left of the target and scintillator-B to the right side of the target, as viewed by the operator from behind the detector. First the detector is rotated until the two counting rates are equal, and then is rotates 45 degrees to the left (counter-clockwise as viewed from above). If scintillator-A has the higher counting rate, the source must be in front of the detector, and if scintillator-B is higher the source must be behind the detector. Thus the front-back ambiguity is resolved.

The equal-counting-rates method and the zero-cross method depend on the overall detection efficiency of the two scintillators being about equal. Usually the detection rates can be equalized by adjusting an electronic setting such as a threshold. But if that is not possible, the two scintillators can be calibrated, or "normalized", by dividing the counting rate of each scintillator by the maximum counting rate seen at any angle. Normalizing in this way eliminates any effects of differential efficiency between the two scintillators.

As an alternative analysis method, the detector could be rotated until the maximum scintillator-A counting rate is determined, and then rotated back until the counting rate is one-half the maximum value, and a first angle noted. Then the operation could be repeated for scintillator-B, and a second angle noted where the B counting rate is half its maximum value. The neutron source direction is then the average of the two "half-maximum" angles so determined. This method does not require that the two scintillators be matched or normalized.

As a further method, a function of the two scintillator rates can be formed that exhibits a peak or other distinct feature at the source angle. For example, the product of the two counting rates usually shows an obvious peak when centered on the source. The peak is due to the neutron and proton having nearly equal masses; it is nearly impossible for a neutron to scatter a proton backwards. Therefore the detector will register counts in both scintillators only when the target is nearly aligned with the source.

All of the analysis methods should closely agree, if the source subtends a small angle relative to the detector angular resolution, which is normally a few degrees. If the various methods give different answers, that means there are probably multiple neutron sources present. Investigators might appreciate knowing that, before approaching the inspection item any closer.

In some cases it may be inconvenient to rotate a detector to determine the scintillator-A and -B counting rates versus angle. Therefore the invention includes a "multiple-angled-detectors" method, in which a plurality of directional detectors is arranged in an array with each detector oriented at a different angle, and the A and B counting rates are monitored for each of the detectors. The various detectors exhibit a higher counting rate in the A or B scintillator depending on whether each detector is pointing to the left or right of the source, and the particular detector that shows about equal counting rates in the A and B scintillators is pointing directly toward the source. For example, successive detectors could be oriented at 10 degrees, 20 degrees, 30 degrees, and so forth, relative to some direction. With such an array there is no need to rotate the detectors; one simply compares the A and B counting rates for the different detectors to determine the neutron direction. The various detectors may be mounted in a vertical array, each pointing at a different angle. Or the detectors could be arranged in a horizontal array, or in a circular mounting, or a wall of detectors all pointing in different directions, or any other spatial distribution so long as they point in different directions and preferably do not obscure each other.

Often the detector is assembled in a multilayer stack with a large number—typically tens to hundreds, possibly thousands—of scintillator layers and target layers. Each scintillator is either of a first type, positioned to a first side of a proximate target, or of a second type, positioned to a second side of a proximate target, the second side being opposite to the first side. The entire stack may be viewed by one light sensor or a plurality of light sensors, all viewing the entire stack at once or viewing sections separately. Further light collectors may be arranged around the stack to convey light from each of the light guide layers to the light sensor. Light funnels can further collect the light. The various light sensors can be arranged all around the detector to view all the layered light guides.

As a further option, the inventive detector may comprise a "curved stack" in which the various hydrogenous targets are all at slightly different angles. To accomplish this, the light guides are shaped like narrow truncated triangles or trapezoids, with one end slightly wider than the other end. The two faces of the light guide are not parallel to each other, but are at slightly different angles. With such a trapezoidal-shaped light guide, the angular orientation of each target in the detector points in a slightly different direction, each target orientation being determined by the accumulated rotation effect from all the trapezoidal light guides. Each light guide then couples to a separate light sensor. Solid-state sensors are good for this since they can be made long and thin to fit the light guide. It is likely that one of the hydrogenous targets in the stack will be oriented along the neutron direction, in which case the A and B scintillators associated with that particular target would register equal detection rates. All the other targets would have more counts scattering to the left or right. The target with equal left and right scattering thus points directly toward the source.

The curved stack with trapezoidal light guides has another advantage. Light in each trapezoidal light guide bounces off the non-parallel surfaces of the light guide, and is successively reflected toward the larger end of the trapezoid. With each successive reflection off the light guide surfaces, the light will be increasingly redirected outward to the larger end. By placing the light sensor on the large end of the light guide, the light collection is thus improved.

Since the invention is a directional detector, and since the neutron changes direction when it scatters, only the first scattering event is useful. Any neutron that scatters in material around the detector and then is detected in the detector, would not useful for localizing the source. Each scattering event introduces a random scattering angle to the neutron direction. Scattering in the vicinity of the source is acceptable, so long as the neutron still arrives at the detector from about the source location. For example, shield material around a source would cause local scattering that effectively spreads out the source region, but the inventive detector would still find the centroid of that larger effective source region.

To minimize scattering ahead of the detector, any unnecessary material should be removed from the region of the detector facing the item to be inspected. This includes both hydrogenous and non-hydrogenous material, since all nuclei can scatter neutrons and ruin the directional correlation. For the same reason, the inventive detector is preferably not deep enough to promote double scattering in the detector. Here the detector depth is the length of the target layer, as seen by the incoming neutron when the target layer is aimed at the neutron source. Neutrons with 1-2 MeV have a scattering length in polyethylene of about 2 cm, so a detector depth of 2-4 cm should be sufficient to scatter most of the neutrons once, without generating many double-scattering events. In some embodiments, the invention may comprise a large array, for example forming a wall adjacent to an inspection item, the wall having a thickness of 2-4 cm to limit double scattering, and an overall length and height corresponding to the size of the inspection item. Even more preferably, the detector array could form a tunnel that nearly surrounds the inspection item, such as a vehicle for example.

The directional neutron detector may be followed or backed up by a second neutron detector which is not directional. The secondary detector would catch any neutrons missed by the directional detector. The secondary detector would also detect the once-scattered neutrons that the directional detector has detected. A wall of directional neutron detectors followed by a wall of non-directional neutron detectors would provide a sensitive tool for detecting nuclear materials. However, some neutrons may be back-scattered from the secondary detector and could re-enter the directional detector from the rear. Such wrong-way neutrons could then produce random signals in the directional detector. The backscattering interference may be mitigated by vetoing any event that has counts in both the directional and secondary detectors at the same time.

Turning now to the figures, FIG. 1 is a cross-section sketch of the inventive detector in the thick-target configuration, with the pulse-shape-discrimination option. The sketch is not to scale. The thin layers (scintillators) are shown greatly expanded for visibility. In an actual embodiment, the thin layers would be so thin that they would not even show up in a sketch of this type.

The detector comprises a thick transparent hydrogenous target layer 103, flanked by a thin first scintillator 101 and a thin second scintillator 102. The scintillators 101 and 102 are both optically coupled to the thick target 103, which is optically coupled to the light sensor 105. The scintillators 101 and 102 are substantially parallel to each other, and are positioned on opposite sides of the target 103. The thick target 103 comprises a hydrogen-rich material such as polyethylene, in a transparent form such as cast polyethylene. Other hydrogenous materials would also work including polystyrene, polycarbonate, and many other transparent polymers. The thick target 103 has a thickness determined by the need to transport light from the scintillators 101 and 102 to the sensor 105. In most cases, such a thickness is far greater than the proton stopping distance, hence it is "thick". Due to the short stopping range of recoil protons, only the outermost thin regions of the target 103 are effective for producing recoil protons that can be detected in the proximate scintillator 101 or 102.

The sketch shows a neutron 120, shown as a solid arrow, arriving from the left and scattering in the target 103, ejecting a recoil proton 121 (hollow arrow) which passes into the second scintillator 102. Responsively, the second scintillator 102 emits a light pulse 122 which is characteristic of the second scintillator 102, and which propagates to the sensor 105, and is detected there. In propagation, the light 122 usually reflects off the outer surfaces of the two scintillators 101 and 102 as shown by a dashed arrow. The light 122 spends most of the time in the thick target 103 because the scintillator layers 101 and 102 are extremely thin, much thinner than they appear in the sketch.

The first scintillator 101 and second scintillator 102 comprise any two different non-hydrogenous scintillators that differ in their light pulse duration. Preferably the scintillators 101 and 102 are not plastic or any hydrogenous scintillator material, since recoil protons from the scintillators would interfere with the directional measurement. A single light sensor 105 detects the light pulses from both scintillators 101 and 102, responsively generating an electronic signal, and then electronics (not shown) can separate the two scintillator signals according to the electronic signal properties. Preferably the difference in pulse duration is sufficient to unambiguously identify each proton recoil event as coming from the first scintillator 101 or the second scintillator 102. The scintillators 101 and 102 preferably have a thickness related to the stopping range of the highest energy recoil proton expected in the measurement. In this example the scintillators 101 and 102 are 40 microns thick, which is sufficient to stop a recoil proton with 2 MeV energy, yet is thin enough that lightly-ionizing backgrounds (from gamma ray interactions, cosmic ray muons, etc.) would generate very little light in passing through the scintillator and thus are rejected reliably on pulse height alone.

The light sensor 105 is any device that detects the scintillator light pulse and responsively generates an electrical signal. The electrical signal must indicate which scintillator, 101 or 102, generated the light, and therefore which direction the neutron 120 arrived from. In the example of FIG. 1, the two scintillators are discriminated according to the shape of the pulse. Multiple sensors 105 may be mounted on all sides of the layered assembly. However, if the sensor 105 includes a substantial amount of neutron scattering material, then the sensor 105 is preferably not positioned between the detector and the incoming neutrons, to avoid blocking the neutrons. An optional light funnel (not shown) may be added between the light guides 104 and the light sensor 105. Examples of suitable sensors 105 include photomultiplier tubes, semiconductor devices such as photodiodes and phototransistors, and especially avalanche diodes such as SiPM devices and the like. Preferably the sensor 105 provides high photon detection efficiency, high gain, and very low noise so that the light pulses from the two scintillators 101 and 102 can be detected and identified as to which scintillator was hit. Array-type sensors such as CCD and CMOS arrays are usually time-integrating-type devices that have a readout interval far longer than the pulse duration, and therefore would not be suitable for the pulse-shape-discrimination version. Such slower sensor types may be satisfactory for the wavelength-discrimination and light-path-discrimination versions, if the noise and background counting rate are sufficiently low. The sensor 105 may further include an image intensifier (not shown) or other light amplifier or electron amplifier to further enhance the signal.

Figure 2:
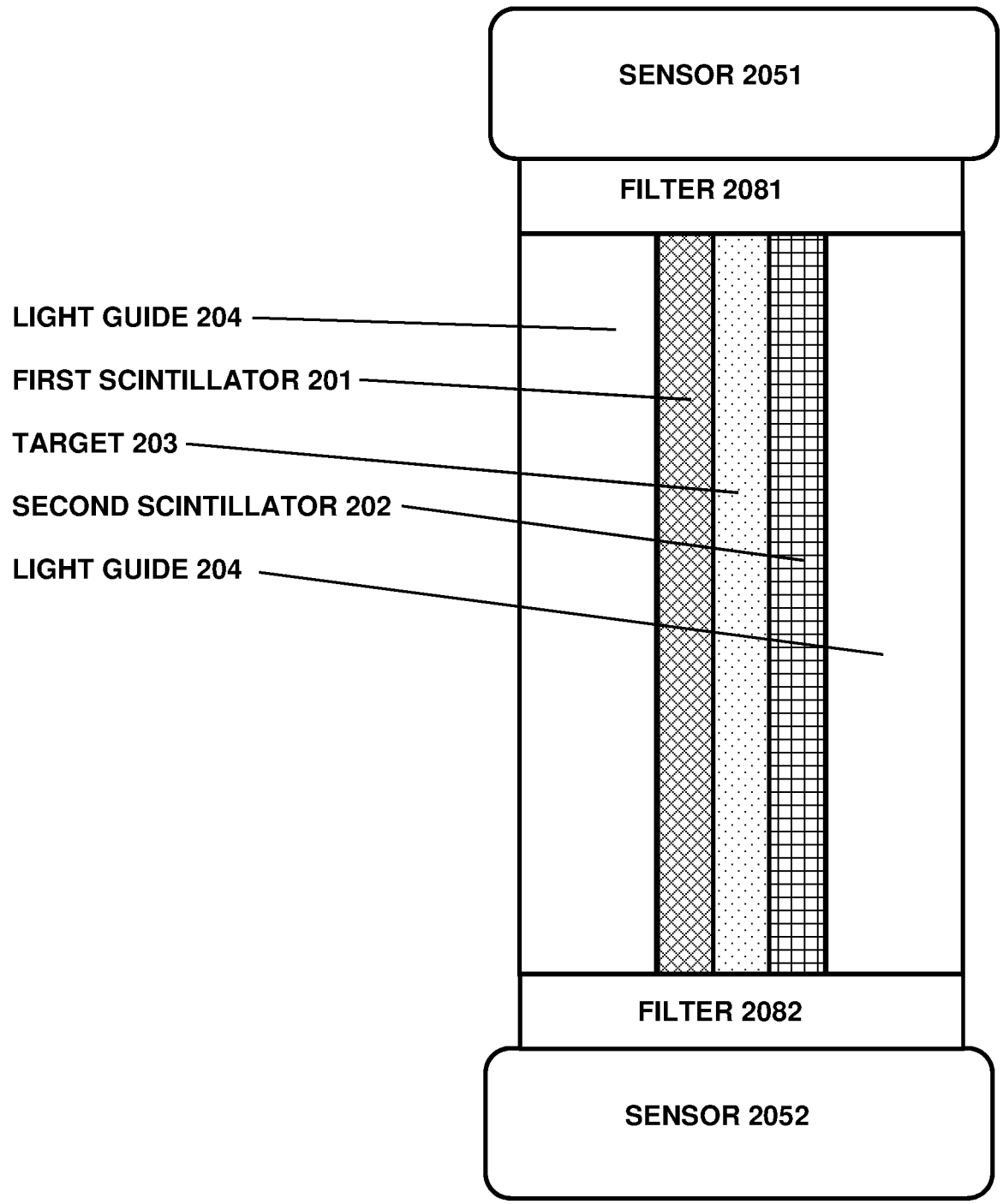
FIG. 2 is a cross-section sketch of a neutron detector according to the invention, in the thin-target configuration, with the wavelength-discrimination option. (Thin layers are not to scale.)

FIG. 2 is a cross-section sketch of the inventive detector in the thin-target configuration, wavelength-discrimination version. Again the thin layers are shown greatly expanded for visibility. Here the hydrogenous target 201 is a thin layer, as are the first scintillator 201 and the second scintillator 202. The scintillators 201 and 202 are inorganic scintillating materials with different wavelength emission bands. The scintillators 201 and 202 are proximate to opposite faces of the thin target 201, and are optically coupled to the two light guides 204, which are optically coupled to two filters 2081 and 2082, which are coupled to two sensors 2051 and 2052. The thin target 203 and the scintillators 201 and 202 are thin in that their thicknesses are related to the stopping range of recoil protons in the respective materials. Specifically, they are all 10 microns thick here. The 10 micron target 203 is thin enough to let many or most of the recoil protons escape, while the 10 micron scintillators 201 and 202 are sufficient to encompass much of the recoil proton tracks. The highest energy recoil protons may pass all the way through a 10 micron scintillator 201 or 202, but in this case that does not matter since the light guides 204 are non-scintillating and thus have no response. For example, the light guides 204 are non-scintillating glass, 10 mm thick. The filters 2081 and 2082 are highpass and lowpass filters respectively, configured to pass the wavebands of scintillators 201 and 202 respectively and block any light outside those bands.

The detector of FIG. 2 indicates the direction of an incoming neutron that scatters in the target 203 according to which scintillator 201 or 202 is hit by the recoil proton. When the detector is rotated so that the neutron enters from the side of the first scintillator 201, the recoil proton usually strikes the second scintillator 202, and vice versa when the detector is rotated so that the neutron enters from the side of the second scintillator 202. When the detector is rotated so that the target 203 is aligned with the neutron source, an equal number of recoil protons trigger the two scintillators 201 and 202. Thus the preponderance of counts from one of the scintillators 201 or 202 indicates that the source is on the other side of the detector, while equality of the two signal rates indicates that the source is directly in the plane of the target 203.

Figure 3:
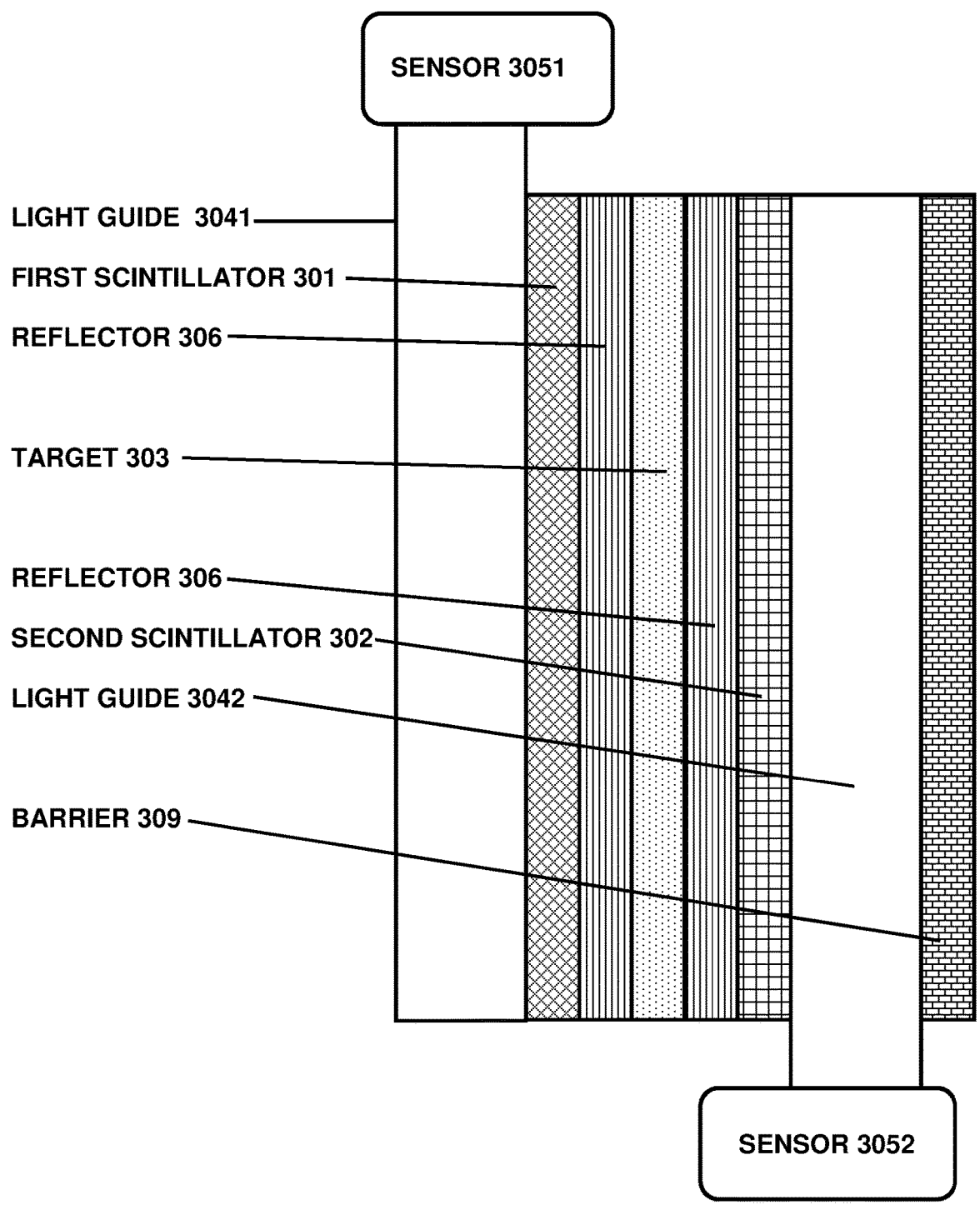
FIG. 3 is a cross-section sketch of a neutron detector according to the invention, in the thin-target configuration, with the light-path-discrimination option. Reflectors and barriers isolate light from the two scintillators. (Thin layers are not to scale.)

FIG. 3 is a cross-section sketch of the inventive detector, thin target configuration, light-path-discrimination version. Again the thin layers are greatly expanded. The central thin target 303 is a polyethylene film coated on both sides with thin aluminum reflector layers 306. The non-hydrogenous light guides 3041 and 3042 are each coated on one side with the first and second scintillators 301 and 302 respectively. In this case the scintillators 301 and 302 are made from the same type of material, with the same light pulse properties. In the light-path-discrimination version of the invention, the active scintillator is identified according to which sensor, 3051 or 3052, registers the event. Since the light paths from the two scintillators are mutually isolated, there is no need to make the two scintillators different. The purpose of the reflectors 306 is to prevent light of each scintillator 301 and 302 from reaching the opposite light guide 3042 and 3041 respectively. The sketch also shows an opaque barrier 309 comprising black paper. The barrier 309 has no function if the detector is simply a single detector module as shown. But if it is to be mounted in a detector stack configuration, with numerous detector modules directly adjacent to each other, then the barrier 309 is necessary to prevent light of each detector module from crossing over into the adjacent module and triggering the wrong sensor.

Figure 4:
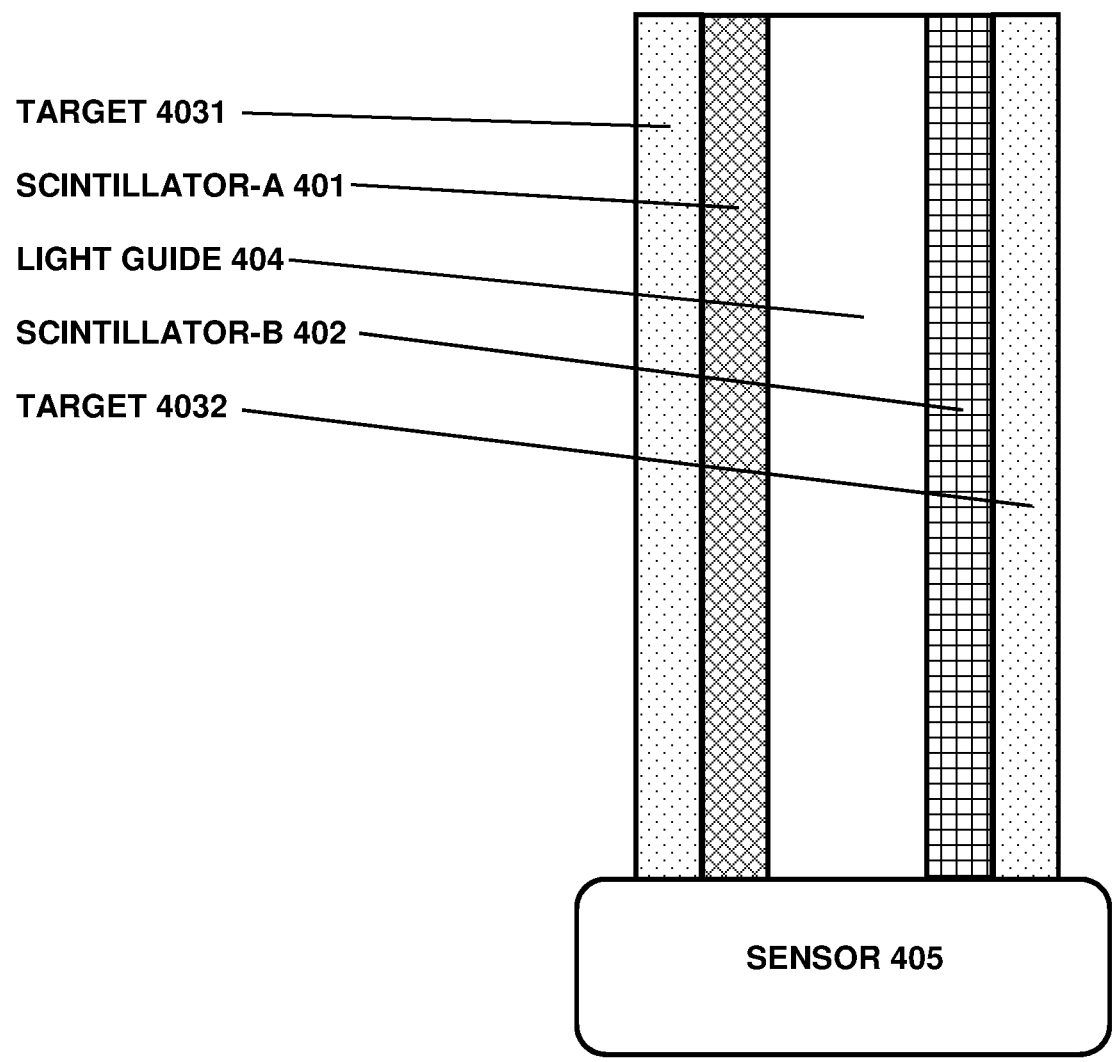
FIG. 4 is a cross-section sketch of a neutron detector according to the invention, in the double-target configuration, with pulse-shape-discrimination. (Thin layers are not to scale.)

FIG. 4 is a sketch in cross-section of the inventive detector, double-target configuration, with pulse-shape-discrimination. A central non-hydrogenous transparent light guide 404, such as glass, is flanked by a first scintillator 401 and, on the opposite side of the light guide 404, by a second scintillator 402. Mounted on the first scintillator 401 is a thin target 4021, and mounted on the second scintillator 402 is a second thin target 4022. The positional relationship of the first scintillator 401 relative to target 4031 is opposite to the positional relationship of the second scintillator 402 relative to target 4032; specifically, the first scintillator 401 is to the right side of the target to which it is proximate (target 4031) whereas the second scintillator 402 is to the left of the target to which it is proximate (target 4032). Therefore, the two scintillators 401 and 402 register recoil protons coming from the right or left directions respectively, thereby indicating via sensor 405 from which direction a neutron has arrived.

Figure 5:
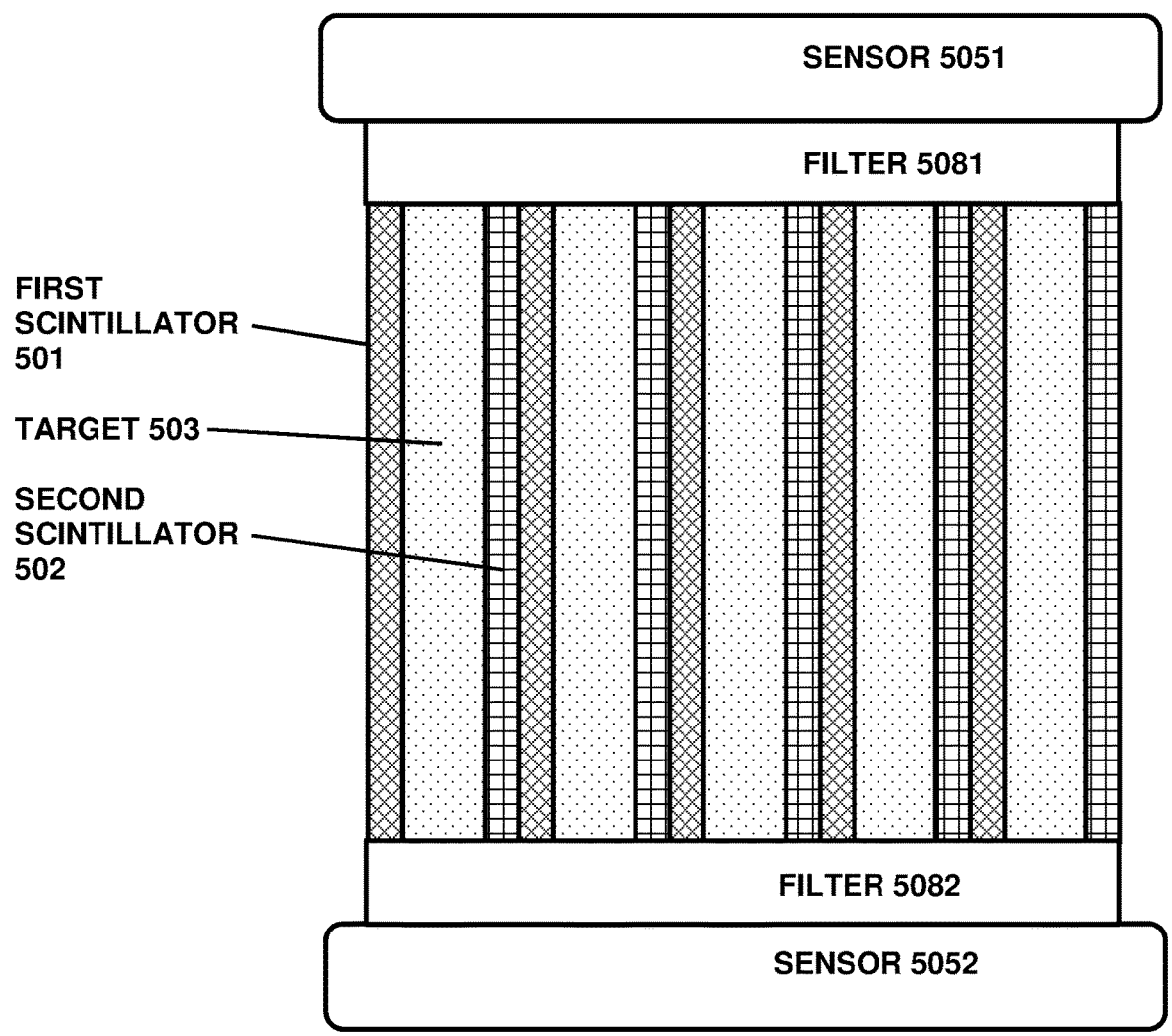
FIG. 5 is a cross-section sketch of the inventive detector stack in the thick-target configuration, with wavelength-discrimination based on two optical filters. Any number of layered detectors may be assembled by continuing in this fashion. (Thin layers are not to scale.)

FIG. 5 is a sketch in cross-section of the inventive detector stack configuration, thick-target configuration, wavelength-discrimination version, with five modules showing although the stack could be extended to as many modules as desired. Thin layers are exaggerated. Only one module is labeled; the others are identical. Thick target 503 is a transparent hydrogenous polymer which has a first scintillator 501 coated on one side of the target 503, and a different second scintillator 502 coated on the other side of the target 503, so that light from both scintillators 501 and 502 can propagate through the transparent target 503 which serves as a light guide. The light may also propagate through the scintillators 501 and 502. The light may pass through adjacent modules since all the layers are transparent as shown.

Two optical filters 5081 and 5082 are optically coupled to all the light guides 503, and optionally to the scintillators 501 and 502 as well. The filters 5081 and 5082 are dichroic filters configured to pass the light of the first scintillator 501 and the second scintillator 502 respectively into sensor 5051 and 5052 respectively. Also the filters 5081 and 5082 are configured to reflect the out-of-band light, so that it may propagate to the other filter and be detected. The sensors 5051 and 5052 view the entire stack at once, and therefore detect a neutron scattering event anywhere in the stack.

Preferably the scintillators 501 and 502 are thick enough to fully stop all recoil protons; otherwise a recoil proton might enter the adjacent scintillator. Any event that triggers both types of scintillators 501 and 502 must be rejected as directionally ambiguous. The targets 503 preferably have a thickness sufficient to propagate the light in both directions. The optimal thickness depends on the material, the surface properties, the overall detector size, and the sensitivity of the sensors 5051 and 5052.

The detector stack of FIG. 5 has higher neutron detection efficiency than the single module of FIG. 1. For neutrons arriving from the side (perpendicular to the target planes), the detection efficiency is higher than that of FIG. 1 due to the extra targets, but is less than five times that of FIG. 1 due to "shadowing", that is, scattering of neutrons in one module before they can be detected in another module. When the detector is aimed directly at the source, on the other hand, the detection efficiency is fully five times that of FIG. 1, since all five targets would then have an unobstructed view of the source. Thus, beneficially, the detection efficiency of the stack is highest for the critical measurement with the detector aimed directly at the neutron source. For this reason and others, the stack configuration provides a statistical advantage that helps to rapidly localize the neutron source.

Figure 6:
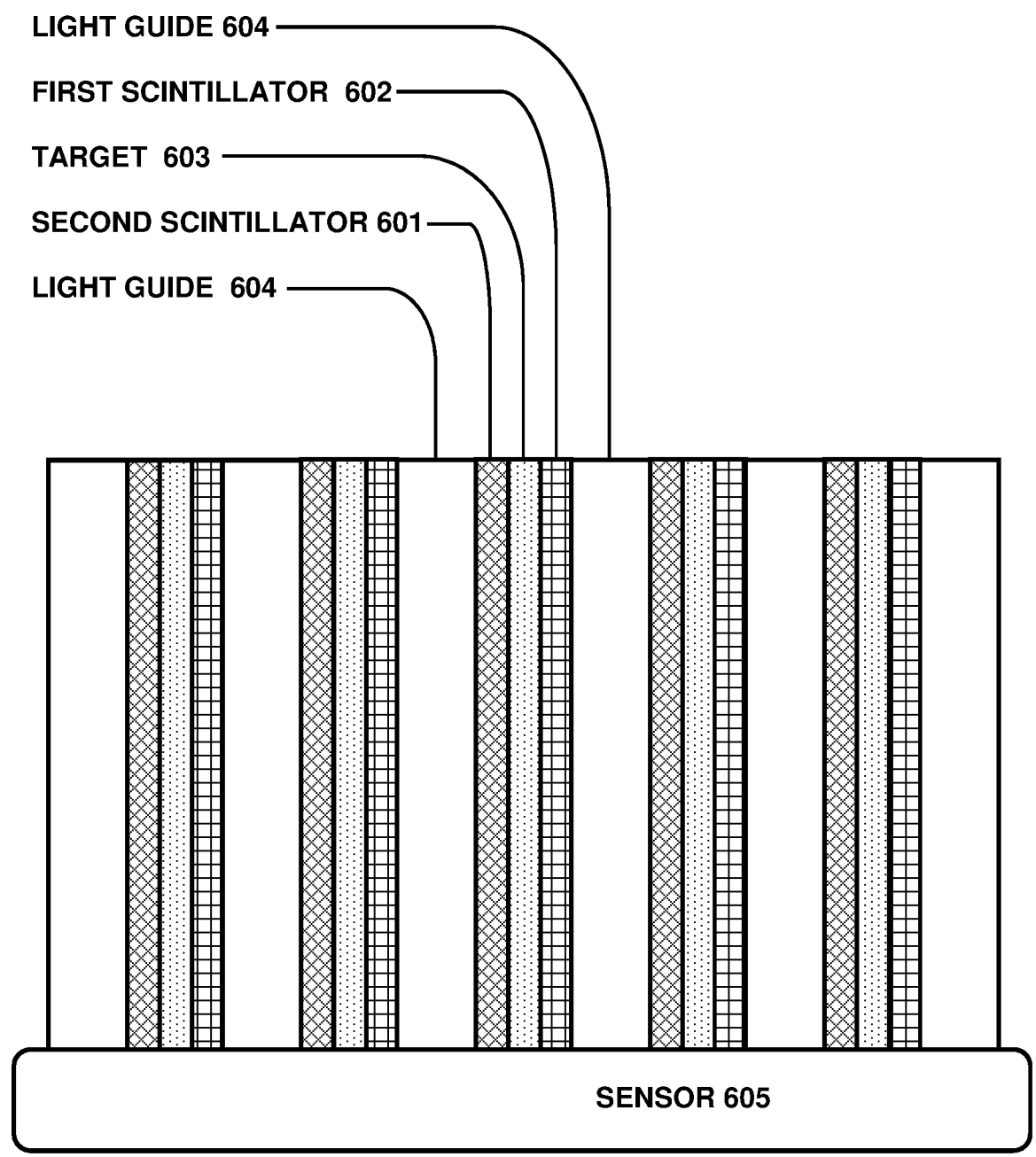
FIG. 6 is a cross-section sketch of the inventive detector stack in the thin-target configuration, pulse-shape-discrimination, with all of the light guides viewed by a single light sensor. (Thin layers are not to scale.)

FIG. 6 is a cross-section sketch of the inventive detector, thin-target configuration, pulse-shape-discrimination version, with five modules showing. Only one module is labeled; the others are identical. Thin layers are exaggerated. Here each thin target 603 is flanked by a first scintillator 601 and a second scintillator 602 on opposite sides of the target 603. Light guides 604 are optically coupled to each scintillator 601 and 602 to transport light to the sensor 605 which views all of the light guides 604 together. In this configuration there is no requirement that the thin scintillators 601 and 602 be sufficiently thick to fully stop all the recoil protons, because any protons that pass all the way through a scintillator layer 601 or 602 will harmlessly stop in the adjacent light guide 604.

Figure 7:
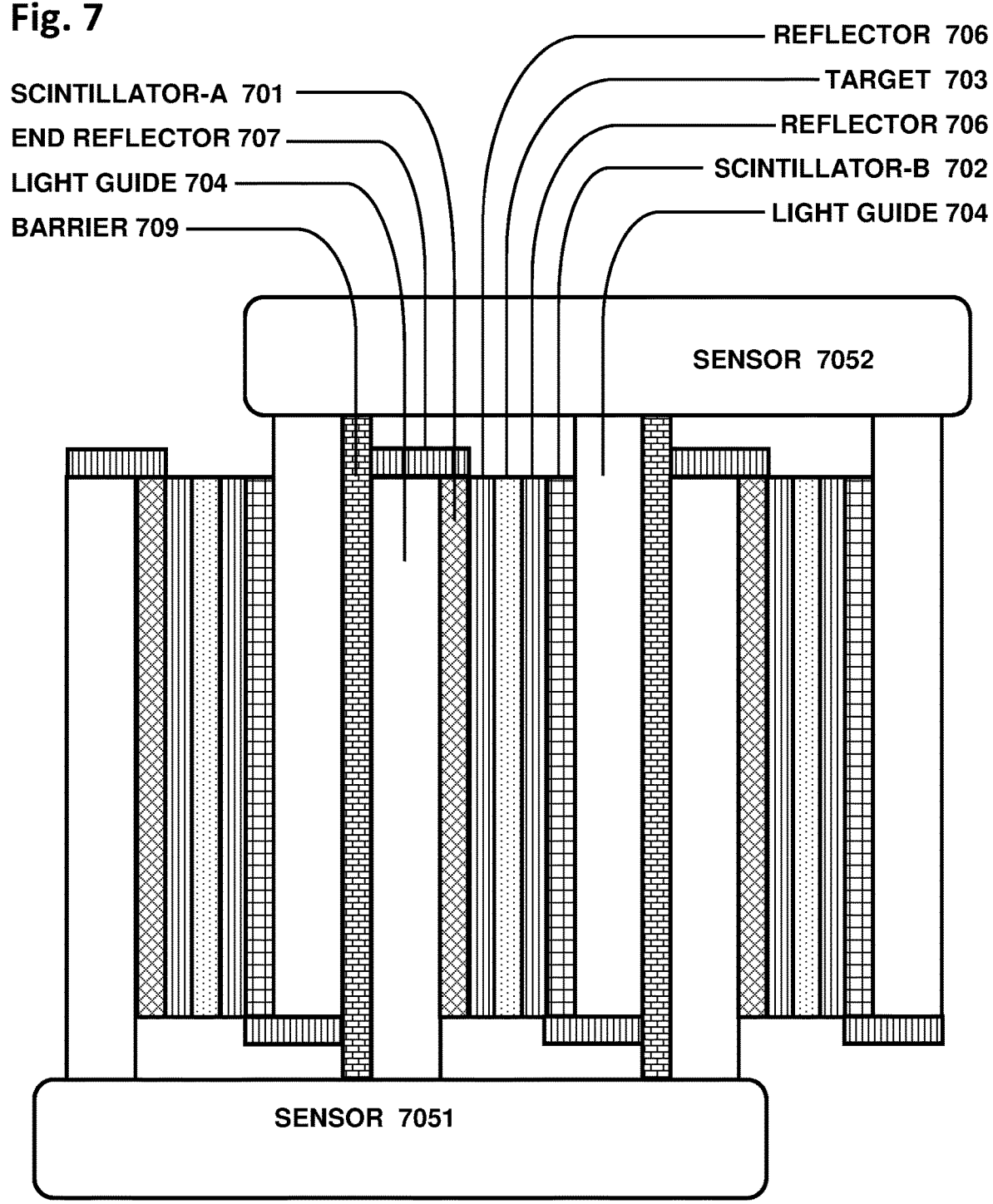
FIG. 7 is a cross-section sketch of the inventive detector stack in the thin-target configuration with light-path-discrimination in which reflectors and barriers keep the light of each scintillator separate. (Thin layers are not to scale.)

FIG. 7 is a cross-section sketch of the inventive detector stack, thin-target configuration, light-path-discrimination version, with three modules showing. Only one module is labeled; the others are identical. Thin layers are shown exaggerated. Reflectors and barriers are arranged to guide the light from each scintillator to its respective sensor, and to prevent light from reaching the adjacent sensors.

Three thin hydrogenous targets 703 have reflector layers 706 on both sides. A first scintillator 701 and a second scintillator 702 are proximate to the target 703 and are positioned on opposite sides of each target 703. A light guide 704 is optically coupled to each scintillator 701 and 702. Two sensors 7051 and 7052 are coupled to the light guides 704 in a "ganged" manner such that light from all of the first scintillators 701 goes to sensor 7051 and the light from all of the second scintillators 702 goes to sensor 7052. Each light guide 704 has an additional end reflector 707 to prevent light from passing into the wrong sensor. Finally an opaque barrier 709 separates adjacent light guides 704 from each other, thereby keeping light from each scintillator 701 and 702 separated. In this way, the reflectors 706 and barriers 709 isolate the light from each scintillator 701 and 702. The two sensors 7051 and 7052 register each recoil proton occurring anywhere in the stack, and ascribe each event to a neutron arriving from the left or from the right according to which scintillator 701 or 702 is active, regardless of where in the stack the event occurred.

Figure 8:
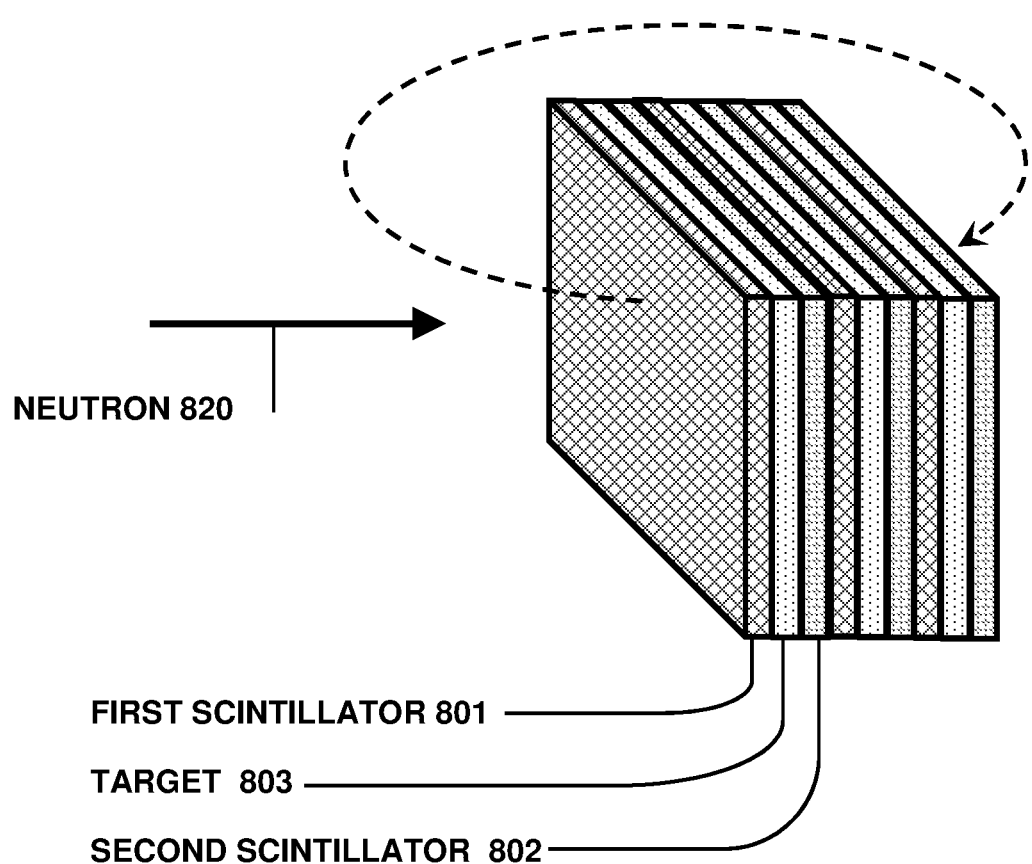
FIG. 8 is a perspective sketch of the inventive detector stack, demonstrating how the stack can be rotated to determine the neutron direction. (Thin layers are not to scale.)

FIG. 8 is a sketch in perspective of the inventive detector stack, comprising a series of layers in a particular order, including a first scintillator 801, a hydrogenous target 803, and a second scintillator 802 in each module, configured to indicate a direction of a neutron 820, which arrives in this case from the left. The detector is then rotated about a vertical axis as indicated by a dashed arrow, while signals from the two scintillators 801 and 802 are monitored. In the orientation shown in the figure, the neutron 820 is likely to scatter in one of the targets 803 and expel a recoil proton into the second scintillator 802. After a rotation of 180 degrees, however, the neutron 820 would scatter a proton into the first scintillator 801 instead, due to the reversed positions of the scintillators 801 and 802 after the rotation. And after a rotation of about 90 degrees, the plane of the targets 803 would be aligned with the direction of the neutron 820, at which point there would be equal probability for a recoil proton to hit each of the first and second scintillators 801 and 802.

In most inspection applications, the azimuthal (horizontal) angle of a neutron source is primarily needed, and therefore the detector is rotated about a vertical axis (or yawed) as shown. In an application where the elevation angle of the source is needed, the detector could first be rotated 90 degrees about a longitudinal axis (rolled 90 degrees) so that the target planes are horizontal, and then the detector could be rotated about a lateral axis (pitched) to acquire elevation data. To determine the full spatial location of the source, the detector could be sequentially rotated in horizontal and vertical directions, or a pair of detectors could be rotated independently in the two directions, and the resulting data subsequently merged.

Figure 9:
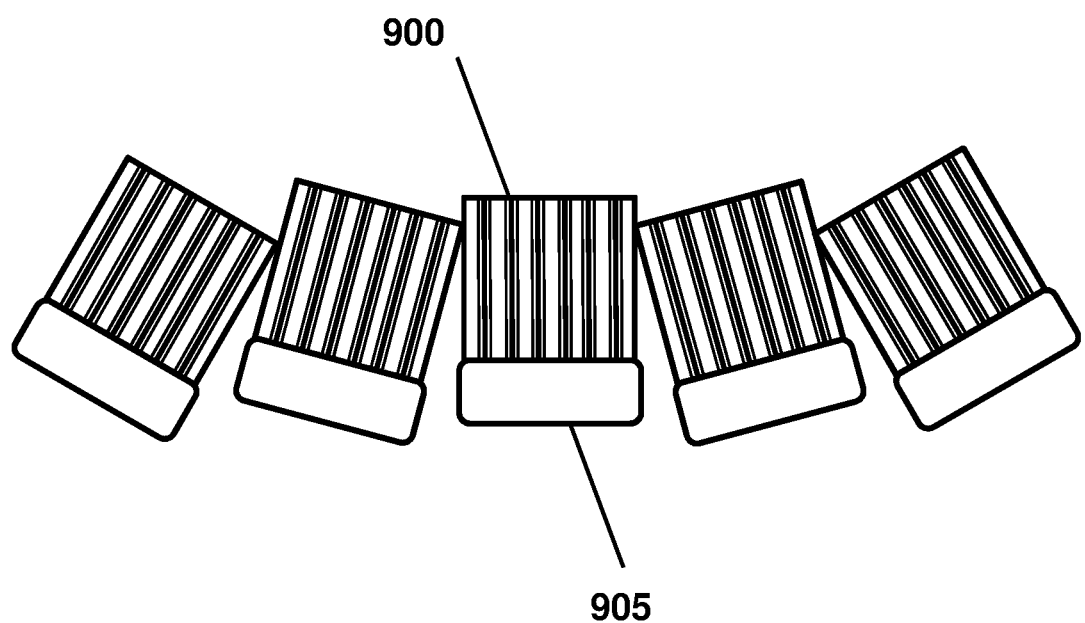
FIG. 9 is a sketch of five inventive detector stacks arranged in an array, with each detector oriented in a different direction. The array determines the neutron direction in real time without having to rotate the detector.

FIG. 9 is a sketch of an array of five of the inventive detectors 900, each with a sensor 905 included. The detectors 900 are shown spread out horizontally, as viewed from the top. Each detector 900 may comprise a detector stack assembly, as suggested by stripes. Each detector 900 is oriented at a different angle, for example being oriented at spaced-apart angles separated by 10 or 20 degrees. Incoming neutrons (not shown) can scatter in any of the detectors 900, generating signals that indicate the direction of the neutron. By analyzing data from all the detectors 900 in the array, the neutron direction can be discerned. If one particular detector is aimed nearly at the neutron source, then that particular detector will have the nearly same counting rate in its two scintillators, thereby indicating that the neutron source is nearly aligned with that particular detector.

Alternatively, the detectors 900 could be arranged in a vertical array with detectors rotated successively like a barber pole, so that each detector 900 points at a different azimuth. The vertical array may be a desirable compact arrangement if space is tight. Or, to scan a large item, a large number of detectors could be arranged in a two-dimensional wall-like array, with each detector having a unique position and angle, so that a large object such as an entire vehicle could be scanned simultaneously.

Figure 10:
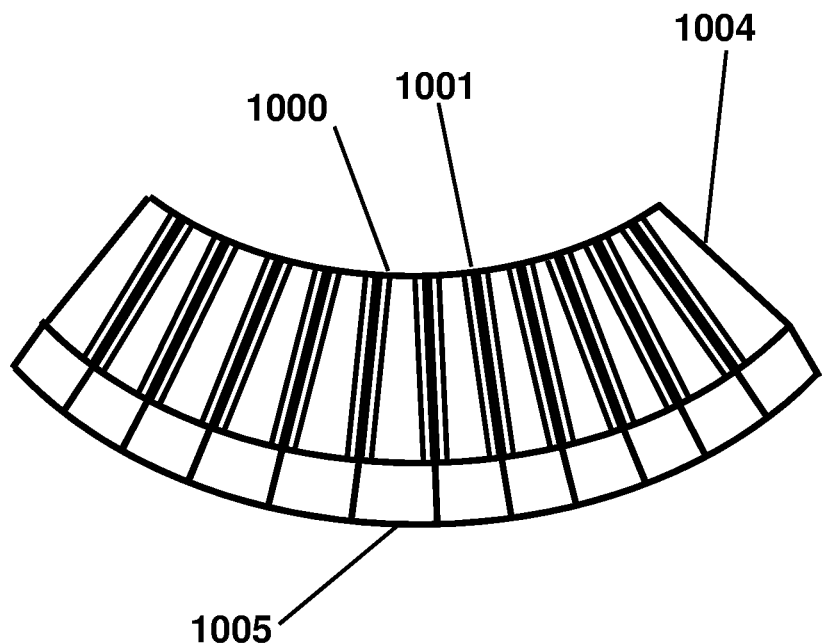
FIG. 10 is a sketch of the inventive detector stack with trapezoidal light guides and a curved overall shape. The various hydrogenous targets in the stack sample all different angles, thereby obtaining data on neutron directions without having to rotate the detector.

FIG. 10 shows a version of the inventive curved detector stack 1000. Here the light guides 1004 are shaped as truncated triangles or trapezoids. Each light guide 1004 is coupled to a light sensor 1005. The thin targets and scintillators, depicted as stripes 1001, are all oriented at different angles due to the non-parallel sides of the light guides 1004. The location of a neutron source (not shown) can be found by analyzing the signals of the various sensors 1005, without having to rotate the detector.

Figure 11A:
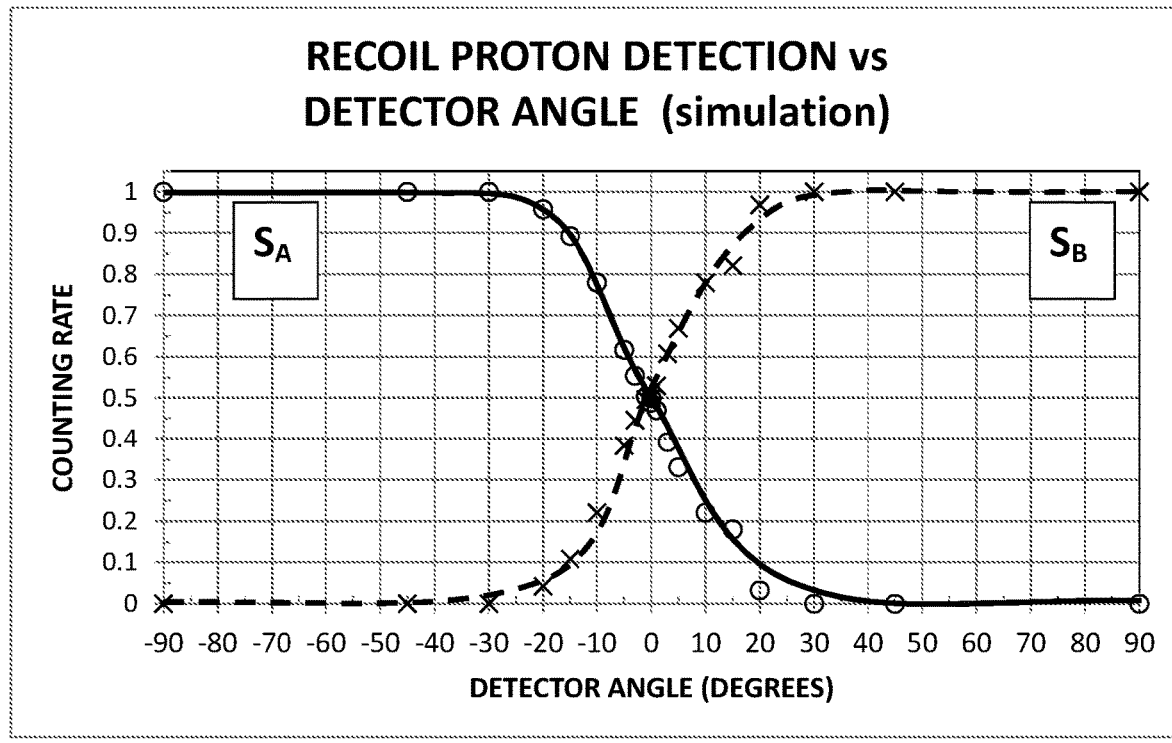
FIG. 11A is a graph showing how the simulated neutron detection rate of the two scintillators varies with angle relative to the neutron source. The source lies in the direction where the two rates are about equal.
Figure 11B:
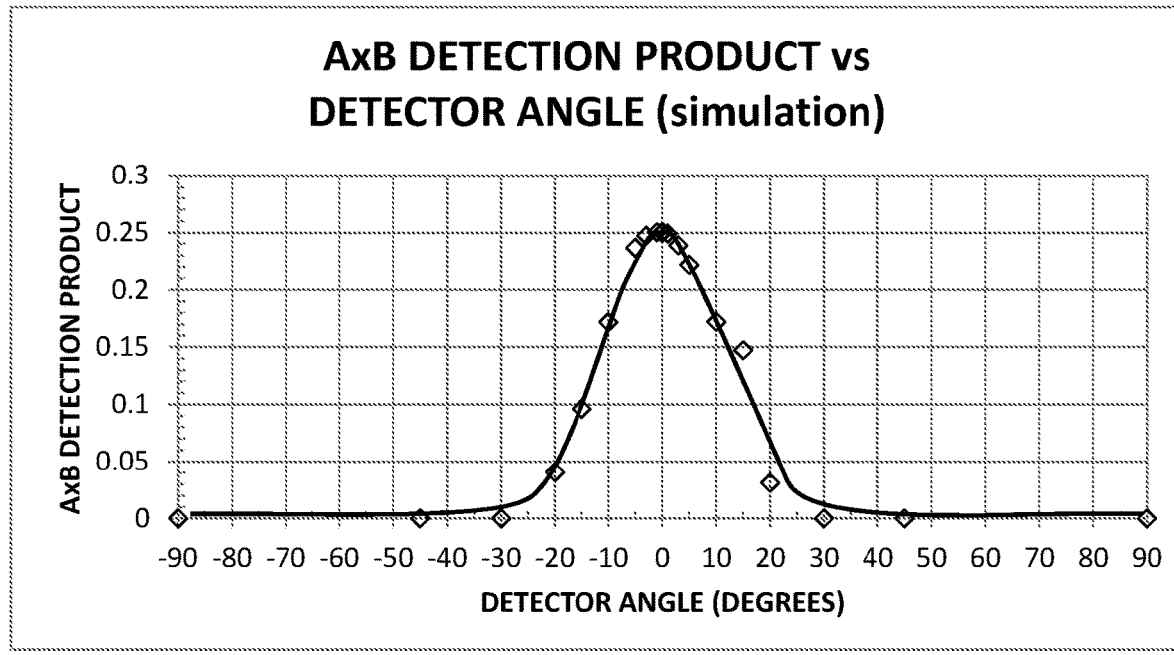
FIG. 11B is a graph showing how the product of the simulated counting rates of the two scintillators exhibits a peak exactly in the direction of the source.
Figure 11C:
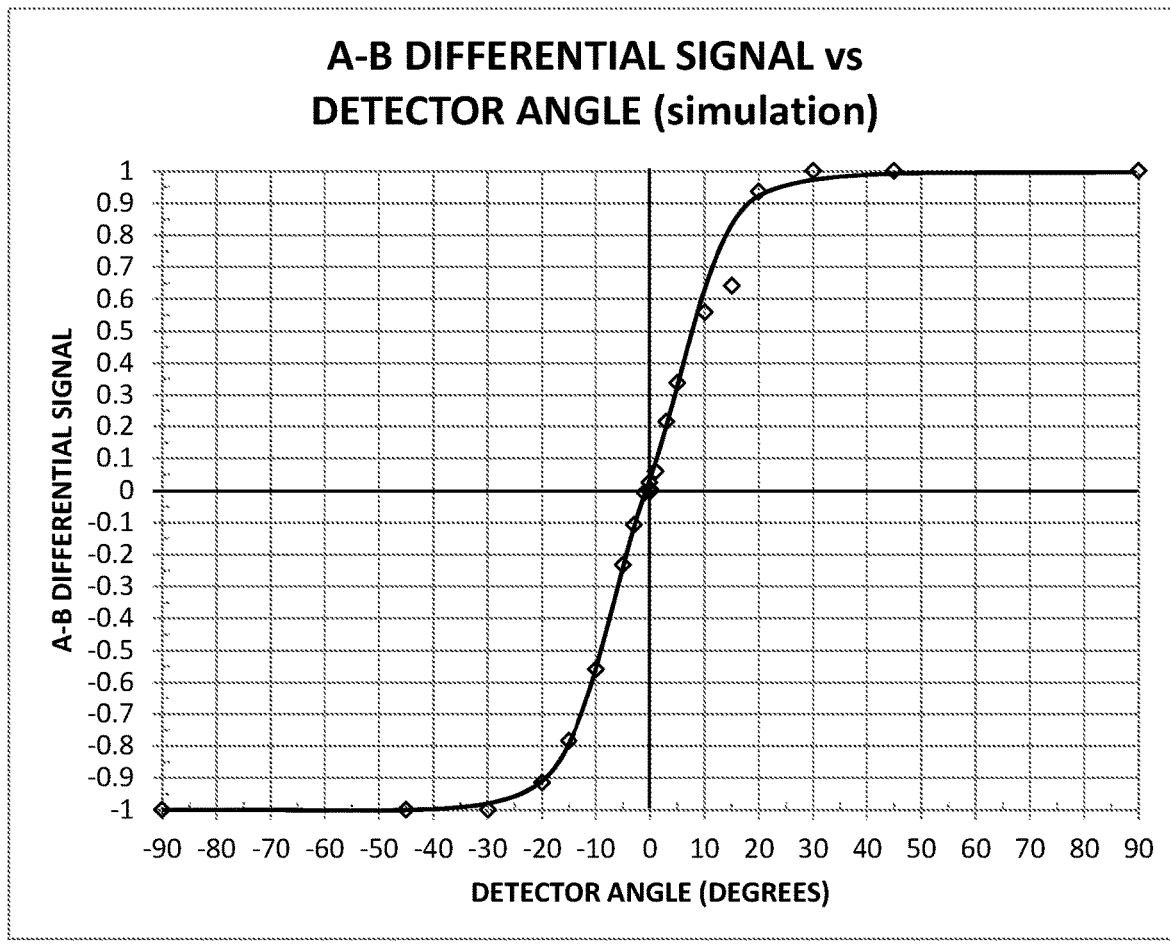
FIG. 11C is a graph showing how the difference between the simulated counting rates of the two scintillators exhibits a zero-crossing at the angle of the neutron source.

FIGS. 11A, 11B, and 11C are graphs showing schematically how the neutron direction may be obtained from the scintillator data. A neutron source is positioned at a direction of zero degrees in the simulation, and the inventive detector is rotated to determine where the source is located. The horizontal axis is the rotation angle of the detector relative to the actual neutron source direction, and the vertical axis gives the simulated data and analysis results. The simulation was carried out using the MCNP6 code with a 10 micron $CH_2$ target between two $CaF_2$ scintillators, and a 2 MeV neutron beam.

FIG. 11A shows the counting rate for the first scintillator ($S_A$) as a solid line, and for the second scintillator ($S_B$) as a dashed line, versus the detector angle in the simulation. The two curves cross at about zero degrees, thereby indicating the neutron source direction where the two scintillators have about the same counting rate. This analysis assumes that the two scintillators have about the same maximum counting rates at large angles such as +−90 degrees, which is evidently true for this case as can be seen in the graph. If, however, the maximum counting rates of the two scintillators are different (due to different scintillator thicknesses or photon efficiencies or transparencies for example), then the data can be normalized by dividing each value by the maximum rate seen at any angle. Usually it is not necessary to normalize the data because usually the two scintillators exhibit closely the same counting rates even if the two scintillators have different properties, and any remaining disparity can be canceled by adjusting electronic parameters such as gains and thresholds and the like.

A second method for determining the neutron direction is to determine the angle at which the first scintillator counts at half its maximum rage, and then determining a second angle at which the second scintillator counts at half its maximum rate, and the average of these two angles is the source azimuth. Or, two standard curves can be fit, one each for the angular data of each scintillator's counts, and the angles where the two curves pass through their half-maximum values could determine the first and second angles. In either case, the two angles are then averaged, and that average angle closely points toward the neutron source. This "average-half-maximum" analysis method does not depend on equal detection efficiency or normalization. Also, background can be easily corrected for by subtracting the minimum count rate from all the data.

FIG. 11B shows a third analysis method in which a peak is derived by multiplying the two scintillator rates versus angle. The product curve exhibits a peak at the source direction. This method works best when the background rates are very low.

FIG. 11C shows another analysis method in which the counting rate for the first scintillator is subtracted from the second scintillator. The source is located at the angle where the difference curve crosses zero. An advantage of this method is that it is not necessary to find the angle where the two counting rates are equal, since a standard curve shape can be fit to several angle data points, and the fit curve would suffice to indicate the zero-cross angle precisely. This method does not require that the background rates are low, so long as both scintillators have about the same background rates.

The methods of FIGS. 11A and 11C also indicate whether the source is in front of the detector or behind it. The front-back position of the source is easily determined according to which of the two counting rates is larger. At an angle of −45 degrees, for example, the first scintillator has a higher counting rate than the second scintillator ($S_A > S_B$) thereby indicating at that the source is in front of the detector. If the source were located behind the detector, the curves would be inverted. For similar reasons, the difference curve of FIG. 11C indicates whether the source is in front or behind the detector. If the curve is rising as the detector angle increases, the source is in front, and if the curve is falling with angle, the source must be behind the detector.

All of the analysis methods disclosed should give substantially the same neutron direction, aside from statistical fluctuations. If they do not agree, then it is likely that multiple neutron sources are present, or that the neutron source is spread out across a large angular range.

Figure 12:
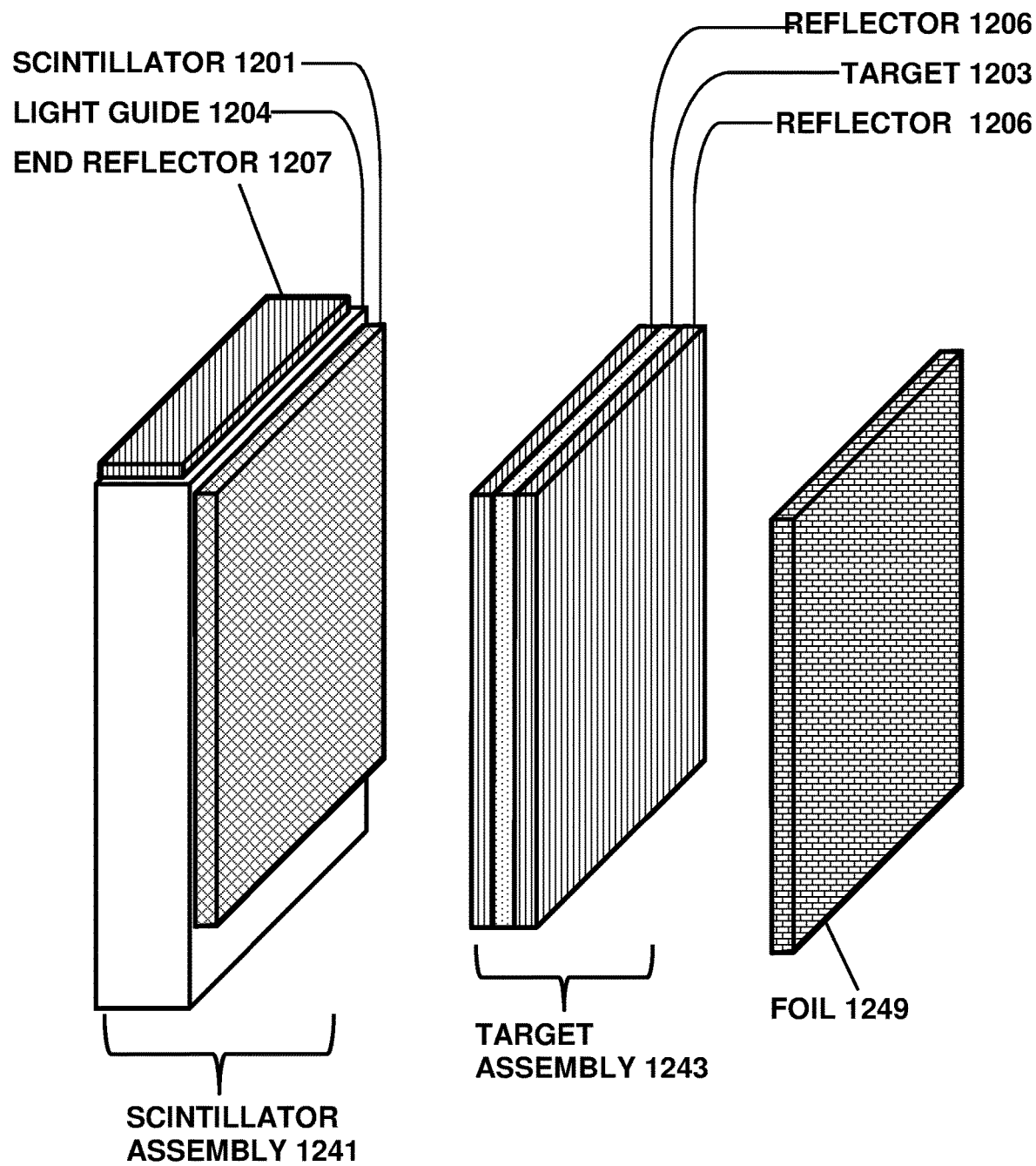
FIG. 12 is a sketch in perspective and partially exploded showing how various subassemblies of the stack configuration of FIG. 7 can be prepared. (Thin layers are not to scale.)

FIG. 12 is a partially exploded perspective sketch of subassemblies of the inventive detector which may be useful for constructing the detector stack configuration such as that of FIG. 7. Here a scintillator assembly 1241 comprises a transparent non-hydrogenous non-scintillating light guide 1204 onto which a first scintillator 1201 is applied. Also an end reflector 1207 is deposited on one end of the light guide 1204. Separately, a target assembly 1243 is prepared by depositing two thin reflector layers 1206 onto both sides of a thin film hydrogenous target 1203. Also a barrier comprising aluminum foil 1249 is prepared. Multiple copies of these subassemblies are then used to build the detector stack as shown in the next figure.

Figure 13:
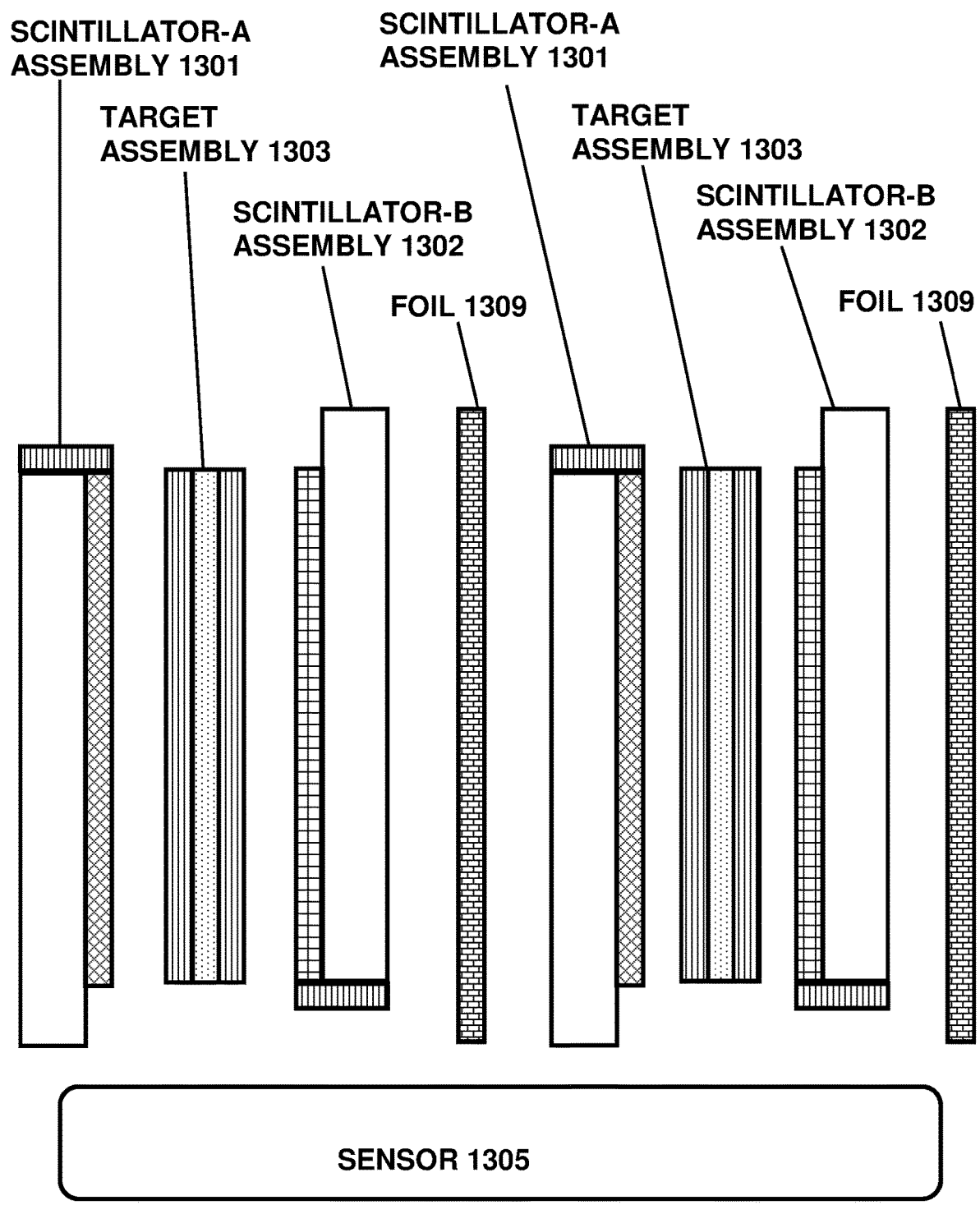
FIG. 13 is a cross-section assembly sketch showing how the subassemblies of FIG. 12 can be assembled into a stack according to FIG. 7. (Thin layers are not to scale.)

FIG. 13 is an exploded assembly view of the inventive detector stack of FIG. 7, thin-target configuration, light-path-discrimination version, with two modules showing. Thin layers are greatly expanded. The arrangement includes four copies of the scintillator assembly 1241 of FIG. 12, but half of them are turned upside-down so that they can detect recoil protons going in the opposite direction. Hence the arrangement includes two scintillator-A assemblies 1301 and two scintillator-B assemblies 1302, both of which use the same scintillator material and emit the same type of light pulse, notwithstanding that they have different labels and patterning. It is easier and cheaper to make the scintillator assemblies all the same, and with light-path-discrimination, there is no need to make them different.

The stack detector is then constructed quite simply, by arranging in sequence a scintillator-A assembly 1301, then a target assembly 1303, then a scintillator-B assembly 1002, so that the two scintillator layers are on opposite sides of the target. Then a foil barrier 1309 is laid down, and the process is repeated for the next module. This can be repeated for as many modules as desired. Then the sensor 1305 is attached, preferably by clear epoxy, to the scintillator-A assemblies so as to collect light from all the scintillator-A layers. A second sensor (not shown) is then attached to the scintillator-B assemblies to collect the light from all the scintillator-B layers.

The sketch shows the scintillator-B assemblies 1302 slightly elevated relative to the scintillator-A assemblies 1301 so that the sensor 1305 contacts only the scintillator-A assemblies 1301, and likewise the second sensor would contact only the scintillator-B assemblies 1302. However this feature is not necessary, since each scintillator-B assembly 1302 is shielded by an end reflector 1307, and likewise each scintillator-A assembly has an end reflector. Even if the sensor 1305 contacts both types of light guides, the end reflectors will still guarantee that only one type of scintillator will be viewed by each sensor. So the sensor 1305 could just as well contact all the light guides if that would simplify construction. The stack so assembled can be tested for channel cross-talk by placing a neutron source at 90 degrees to the target planes, so that one type of scintillator should register hits and the other should count zero.

Figure 14:
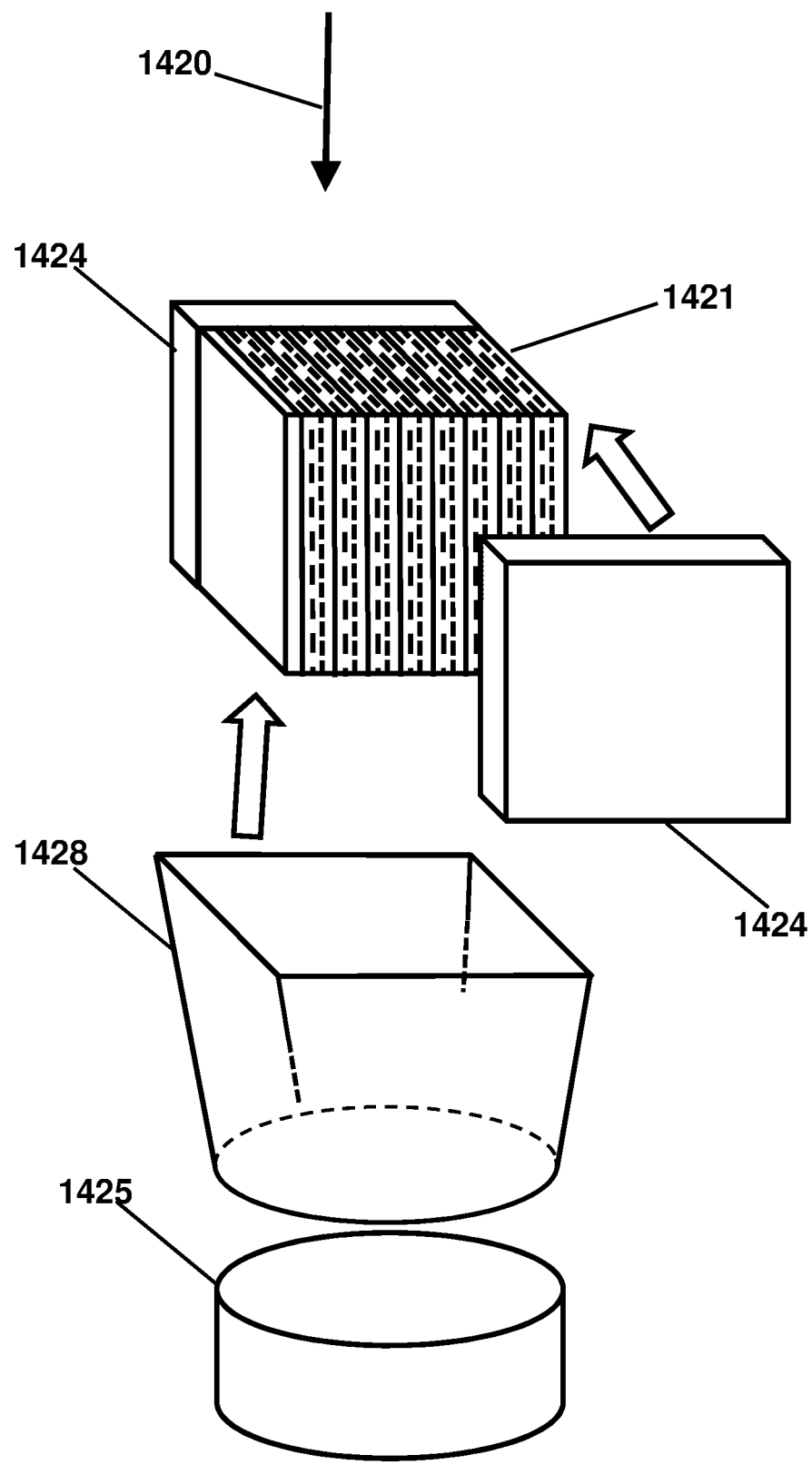
FIG. 14 is a sketch in exploded perspective of the inventive detector stack, with optional secondary light guides and a light funnel.

FIG. 14 is an exploded sketch in perspective, of the inventive stack 1421 with two secondary light guides 1424 coupled to the exterior of the stack 1421 to collect light from each layer. Also a light funnel 1428 collects light from the stack 1421 as well as the secondary light guides 1424, and couples all the light pulses into a sensor 1425. A neutron 1420 enters the stack 1421 from the top. The arrangement preferably has little or no material in the way of the neutron 1420, thereby avoiding scattering or absorption of the neutrons 1420 before they reach the stack 1421.

Figure 15:
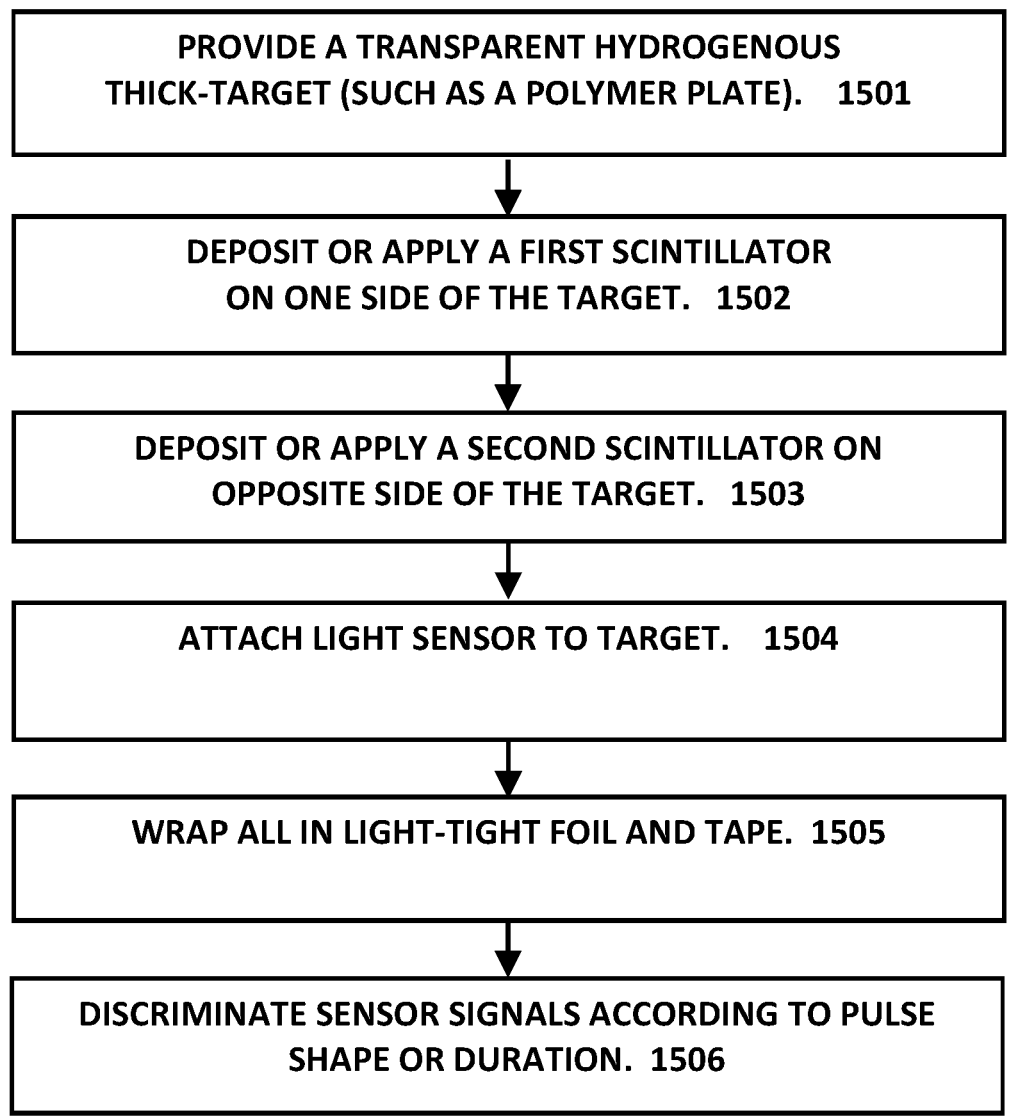
FIG. 15 is a flowchart showing steps of an inventive method for assembling the thick-target detector of FIG. 1.

FIG. 15 is a flowchart showing how the inventive detector can be built in the thick-target configuration, pulse-shape-discrimination version, such as that of FIG. 1. First a transparent hydrogenous thick-target such as a plate of polyethylene or styrene or carbonate or acrylic or other polymer is provided at step 1501. Then a first scintillator is deposited or applied to one side of the target at 1502. The first scintillator may be deposited by evaporation or sputtering or CVD or solvent evaporation, or other deposition process suitable for the first scintillator material.

If the deposition process is potentially damaging to the target, the first scintillator may be applied instead to a backing plate such as aluminum foil, or other robust material, which is preferably highly reflective so that it will assist in light propagation when the detector is finally assembled.

The first scintillator with backing plate may then be pressed to the target, closing the gap so that the recoil protons can get into the first scintillator from the target, and so the light pulse can get into the target from the scintillator. If pressing the first scintillator against the target does not provide sufficient optical coupling for the scintillator light to pass efficiently between the first scintillator and the target, then a film of an optical coupling material such as a gel or clear epoxy may be applied to close the joint. Preferably such a material contains abundant hydrogen, in which case the hydrogenous coupling material would not comprise an obstruction to the recoil protons, but would serve as an extension of the hydrogenous target itself. In other words, if the coupling material is hydrogenous, there is no need to keep the coupling layer thin.

Then at 1503 the other scintillator is deposited or applied to the opposite side of the target, and a light sensor is attached to the target at 1504 to receive the light from both scintillators. The entire detector is then wrapped in a light-tight cover such as foil and tape at 1505. In use, the sensor generates signals related to the light pulses, which can be discriminated electronically at 1506, thereby indicating which scintillator was hit by the recoil proton, and thus the general direction toward the neutron source.

Figure 16:
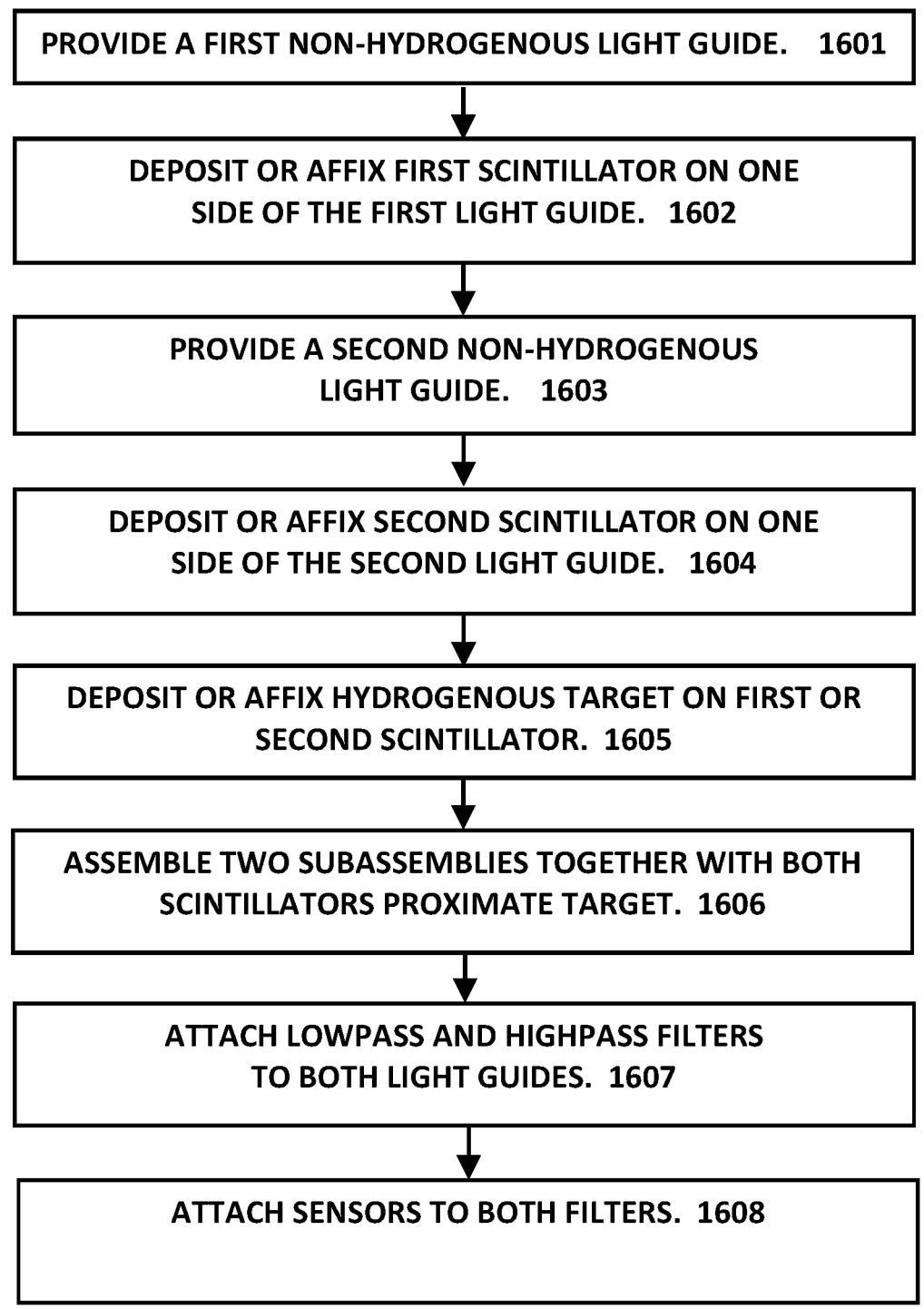
FIG. 16 is a flowchart showing steps of an inventive method for assembling the thin-target detector of FIG. 2.

FIG. 16 is a flowchart showing how the inventive detector can be built in the thin-target, wavelength-discrimination configuration such as FIG. 2. First a non-scintillating, non-hydrogenous, transparent light guide is prepared 1601, and a thin layer of the first scintillator material is deposited on it at 1602. Optionally, a thin reflective layer may then be deposited on the first scintillator layer. A second light guide is prepared at 1603, and the second scintillator layer is deposited or otherwise affixed to it at 1604. The second scintillator produces light with a different wavelength band than the first scintillator. Then a thin hydrogenous target is deposited or affixed to one of the scintillators at 1605, or alternatively a half-thickness of the target material can be deposited on both of the scintillators. In any case, the two subassemblies are then pressed together so that both of the scintillators are proximate to the target but on opposite sides of the target at 1606. Two optical filters are then provided, one a lowpass filter and the other a highpass, each configured to pass only the light from one of the scintillators. The filters are then coupled to both of the light guides at 1607, and two sensors are attached to the filters at 1608 if not previously attached to them. Alternatively, each filter could be attached to its respective light guide alone, rather than to both of the light guides, thereby further separating the two light pulses.

Figure 17:
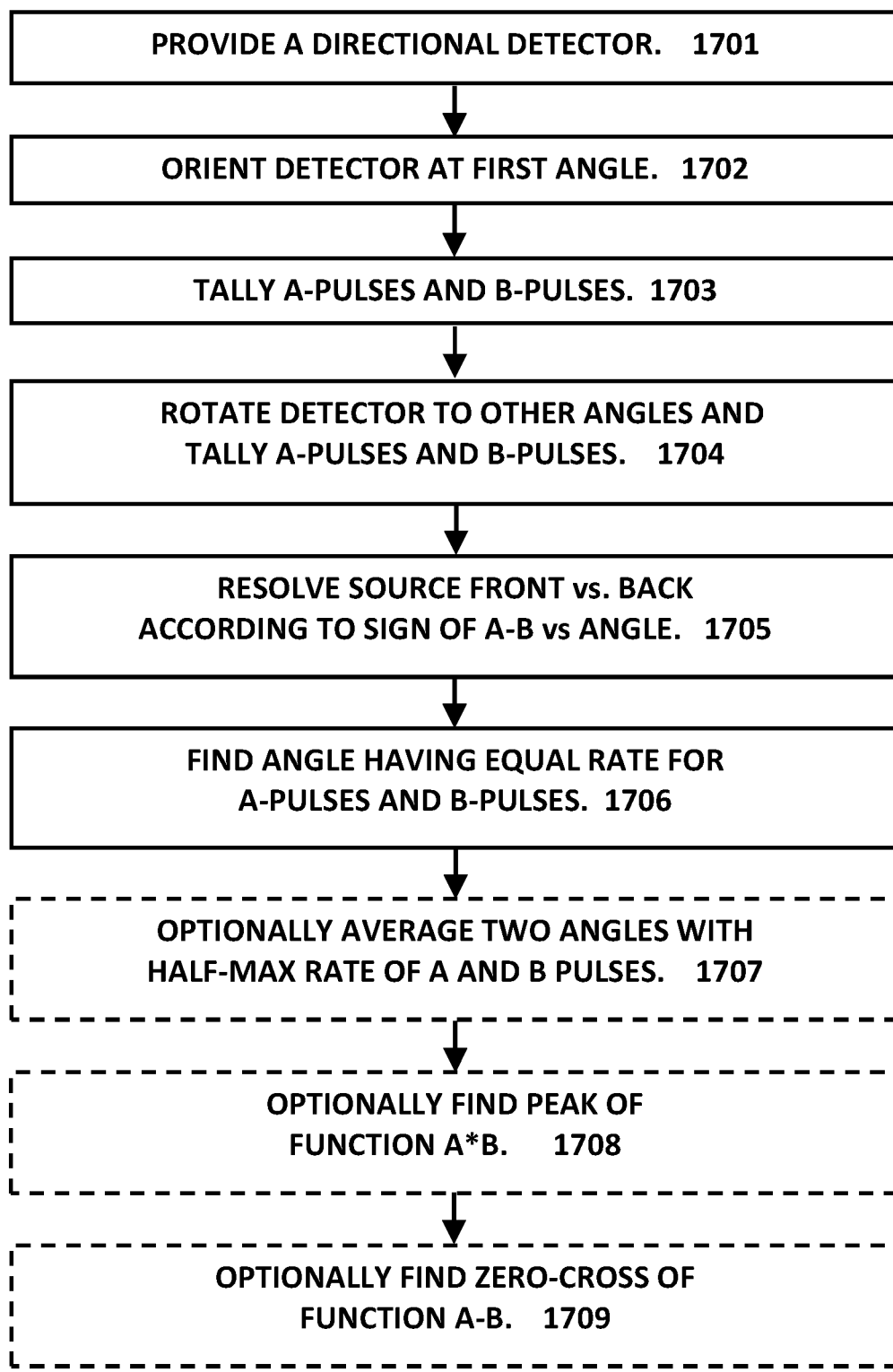
FIG. 17 is a flowchart showing steps of an inventive method for deriving the neutron direction from the A and B scintillator counting rates.

FIG. 17 is a flowchart showing how to use the inventive detector to determine the direction of neutrons. First at 1701 a directional detector is provided, such as any of the detector configurations described herein. Then at 1702 the detector is oriented at a particular starting angle, and at 1703 the number of light pulses from first-scintillator events and second-scintillator events (here termed A-pulses and B-pulses respectively) are counted or tallied. Then at 1704 the detector is rotated to other angles, which may be equally-spaced stepped-apart angles, or other sequence of orientations, and the A-pulses and B-pulses are tallied at each orientation. (Alternatively, a plurality of similar detectors could be all oriented at different angles, and their tallies analyzed in the same way, without the need for rotating.) The front-to-back ambiguity is resolved at 1705 by noting the sign of the difference A-B versus angle, which depends on whether the neutron source is in front of or behind the detector. A particular angle is then found at 1706 by rotating the detector until the counting rates for the A-pulses and B-pulses are substantially equal. The detector then points directly at the neutron source. As an optional confirmation analysis, the detector could be rotated until the A-pulse rate is about half of the maximum A-pulse rate seen at any orientation, and the angle noted at 1707. Then the same determination is repeated for the B-pulses, and the two angles (corresponding to the half-maximum rates) are averaged to obtain a second determination of the source direction. A third determination can be made at 1708 by finding a peak in a particular function, such as the product of the A and B counting rates versus angle. A fourth determination can be made at 1709 by finding the zero-crossing of a function such as the difference between the A and B counting rates versus angle, which passes through zero when the detector is aligned with the source.

The inventive directional neutron detector will enable inspectors to detect and localize neutron sources at critical national inspection sites such as border crossings and shipping ports, as well as places where neutron sources may be present such as nuclear reactors and research facilities. By indicating the direction of the neutron source, the detector amplifies the statistical power of each detection, rapidly distinguishing a point source from a uniform background. As a multi-detector array, the invention is suitable for large-item inspections such as whole-vehicle scanners. In smaller configurations, the invention enables efficient localization of contaminants or smuggled material on workers in a walk-through portal. As a hand-held survey monitor, the invention indicates to the operator whether a neutron source is to the left or right of the detector, and also indicates when the detector is directly pointing toward the source. The invention enables rapid, efficient, and precise neutron source localization that is not possible with prior art.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

What is claimed is:

1. A device for locating a radioactive source, comprising:
    a target comprising a substantially planar layer comprising hydrogenous material configured to emit a recoil proton responsive to a neutron scattering event therein, the target being oriented parallel to a centrally positioned target plane;
    a first scintillator comprising a substantially planar layer of material configured to emit a light pulse of a first type responsive to traversal by a charged particle, the first scintillator being parallel to the target plane and proximate to a first side of the target layer;
    a second scintillator comprising a substantially planar layer of material configured to emit a light pulse of a second type responsive to traversal by a charged particle, the second scintillator being parallel to the target plane and proximate to a second side of the target layer, the second side being opposite to the first side of the target layer; and
    a processor configured to count the first type pulses and the second type pulses, and thereby determine whether the radioactive source is located closer to the first scintillator or the second scintillator.

2. The device of claim 1, wherein the processor is configured to determine that the radioactive source is on the same side of the target plane as the first scintillator when the count of second type pulses is greater than the count of first type pulses, and to determine that the radioactive source is on the same side of the target plane as the second scintillator when the count of first type pulses is greater than the count of second type pulses.

3. The device of claim 1, wherein the processor is configured to determine that the radioactive source is aligned with the target plane when the count of first type pulses is substantially equal to the count of second type pulses.

4. The device of claim 1, wherein the processor is configured to determine an angle between the target plane and a vector toward the radioactive source by calculating a difference between the counts of the first type and second type pulses or a ratio of the counts of first type and second type pulses, and by comparing that difference or ratio to a predetermined angular distribution that relates the angle to the calculated difference or ratio.

5. The device of claim 4, wherein the processor is configured to determine whether the radioactive source is in front or behind the device by comparing the calculated difference or ratio at multiple orientations of the device respectively.

6. The device of claim 1, wherein the processor is further configured to determine an angular size of the radioactive source by comparing an angular distribution of the counts of first type or second type pulses to a predetermined correlation that relates the angular size of the radioactive source to the distribution of counts.

7. The device of claim 1, wherein the processor is configured to determine a direction toward the radioactive source by calculating a difference between the counts of first type and second type pulses at a plurality of orientations respectively and then determining an angle at which that difference approaches zero, or by calculating a ratio of first type and second type pulses at a plurality of orientations respectively and then determining an angle at which that ratio approaches unity.

8. The device of claim 1, wherein the processor is configured to determine a direction toward the radioactive source by calculating a product comprising the count of first type pulses times the count of second type pulses, and then determining an angle at which that product is maximal.

9. The device of claim 1, wherein the processor is configured to determine a direction toward the radioactive source by calculating to a function based at least in part on the first type pulses and the second type pulses.

10. The device of claim 1, wherein:
    the target comprises a material that emits a light pulse of a third type, different from the first and second type light pulses, when traversed by a charged particle;
    the processor is configured to count first-type events comprising simultaneous pulses from the target and the first scintillator, and second-type events comprising simultaneous pulses from the target and the second scintillator; and
    the processor is configured to determine a direction toward the radioactive source according to a difference between the count of first-type events and the count of second-type events, or a ratio of the count of first-type events divided by the count of second-type events.

11. The device of claim 1, wherein the first scintillator layer has a thickness related to the stopping range of the recoil proton therein, the second scintillator layer has a thickness related to the stopping range of the recoil proton therein, and the target layer has a thickness related to the stopping range of the recoil proton therein.

12. The device of claim 1, wherein the target layer and the first scintillator are substantially transparent to the second type light pulses, and the target layer and the second scintillator are substantially transparent to the first type light pulses.

13. The device of claim 1, further comprising a first light guide optically coupled to the first scintillator, a second light guide optically coupled to the second scintillator, and a barrier of opaque material configured to optically isolate the first and second light guides from each other.

14. A system comprising:
- a plurality of targets, each target comprising a substantially planar layer of hydrogenous material configured to emit a recoil proton responsive to a neutron scattering therein, each target having a first side and a second side which is opposite the first side;
- a plurality of first scintillators, each first scintillator comprising a substantially planar layer of non-hydrogenous material that emits a first light pulse responsive to traversal by a charged particle, each first scintillator being proximate to the first side of one target of the plurality of targets respectively;
- a plurality of second scintillators, each second scintillator comprising a substantially planar layer of non-hydrogenous material that emits a second light pulse responsive to traversal by a charged particle, each second scintillator being proximate to the second side of one target of the plurality of targets respectively;
- a centrally positioned target plane oriented parallel to the targets, wherein the target plane is a boundary between a first region and an opposite second region; and
- a processor configured to calculate a first detection rate according to the first light pulses and a second detection rate according to the second light pulses, and to determine that a neutron source is in the first region when the second detection rate is greater than the first detection rate, and that the neutron source is in the second region when the first detection rate is greater than the second detection rate.

15. The system of claim 14, wherein the processor is further configured to indicate that the neutron source is aligned with the target plane when the first detection rate is substantially equal to the second detection rate.

16. The system of claim 14, wherein each target of the plurality of targets is configured to emit a third light pulse, different from the first and second light pulses, when traversed by a charged particle.

17. The system of claim 14, further including a light sensor configured to detect the first light pulses and the second light pulses, and wherein the processor is configured to distinguish the first light pulses from the second light pulses by pulse shape analysis.

18. The system of claim 14, further including a first light sensor, a second light sensor, and a plurality of opaque layers wherein:
- each opaque layer of the plurality of opaque layers is configured to optically isolate the first scintillators from the second scintillators;
- the first light sensor is configured to detect the first light pulses; and
- the second light sensor is configured to detect the second light pulses.

19. A device for locating a neutron source, comprising:
- a planar hydrogenous target layer configured to emit a recoil proton when struck by a neutron from the neutron source;
- a left scintillator positioned on a left side of the target layer and configured to detect recoil protons therein;
- a right scintillator positioned on a right side of the target layer, the right side being opposite to the left side, and configured to detect recoil protons therein;
- and a processor configured to determine that the neutron source is on the left side of the target layer when the right scintillator detects more recoil protons than the left scintillator, and that the neutron source is on the right side of the target layer when the left scintillator detects more recoil protons than the right scintillator.

20. The device of claim 19, wherein the processor is further configured to determine that the neutron source is aligned with the target layer when the left scintillator and the right scintillator detect substantially equal numbers of recoil protons.

* * * * *